(12) United States Patent (10) Patent No.: US 12,020,532 B2
Simpson (45) Date of Patent: *Jun. 25, 2024

(54) IMPLEMENTATIONS OF A COMPUTERIZED BUSINESS TRANSACTION EXCHANGE FOR VARIOUS USERS

(71) Applicant: CirclesX LLC, Houston, TX (US)

(72) Inventor: Erik Mowery Simpson, Houston, TX (US)

(73) Assignee: CIRCLESX LLC, Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 17/493,432

(22) Filed: Oct. 4, 2021

(65) Prior Publication Data

US 2022/0028208 A1 Jan. 27, 2022

Related U.S. Application Data

(63) Continuation of application No. 15/266,326, filed on Sep. 15, 2016, now Pat. No. 11,138,827.

(51) Int. Cl.
*G06F 17/00* (2019.01)
*A63F 13/35* (2014.01)
(Continued)

(52) U.S. Cl.
CPC .......... *G07F 17/3225* (2013.01); *A63F 13/35* (2014.09); *A63F 13/792* (2014.09);
(Continued)

(58) Field of Classification Search
None
See application file for complete search history.

(56) References Cited

U.S. PATENT DOCUMENTS

| 4,476,954 A | 10/1984 | Johnson et al. |
| D318,073 S | 7/1991 | Jang |

(Continued)

FOREIGN PATENT DOCUMENTS

| CN | 107341968 A | 11/2017 |
| GB | 2539556 A | 12/2016 |

(Continued)

OTHER PUBLICATIONS

PCT International Search Report and Written Opinion; PCT/US2020/027543; dated Jul. 1, 2020.

(Continued)

*Primary Examiner* — Sunit Pandya
(74) *Attorney, Agent, or Firm* — Pramudji Law Group PLLC; Ari Pramudji

(57) ABSTRACT

Implementations of various systems and methods for using a social network, a game engine network, and a network to provide users of the networks the ability to integrate their everyday personal and business transactions with charity projects and people globally. Users of the methods on the network use a reality based game strategy and structure through the use of reality, augmented reality and mixed reality technologies to integrate and link their everyday tasks of personal and business transactions to charity network projects and users in an invention that formerly did not exist. Implementations of methods described herein link people who need help with those who transact or participate on the system in everyday business transactions. Implementations of methods for users then have a scrapbook of how their everyday common tasks and transactions added up in a record that truly changed the world and influenced people towards social good.

20 Claims, 22 Drawing Sheets

(51) Int. Cl.
*A63F 13/792* (2014.01)
*A63F 13/795* (2014.01)
*G06Q 30/0279* (2023.01)
*G06Q 50/00* (2012.01)
*G07F 17/32* (2006.01)

(52) U.S. Cl.
CPC ....... *A63F 13/795* (2014.09); *G06Q 30/0279* (2013.01); *G06Q 50/01* (2013.01); *G07F 17/3244* (2013.01)

(56) References Cited

U.S. PATENT DOCUMENTS

| | | |
|---|---|---|
| 5,412,560 A | 5/1995 | Dennison |
| 5,604,676 A | 2/1997 | Penzias |
| 5,726,885 A | 3/1998 | Klein et al. |
| 5,751,245 A | 5/1998 | Janky et al. |
| 5,973,619 A | 10/1999 | Paredes |
| 6,175,831 B1 | 1/2001 | Weinreich et al. |
| 6,240,396 B1 | 5/2001 | Walker et al. |
| 6,285,999 B1 | 9/2001 | Page |
| D453,945 S | 2/2002 | Shan |
| 6,356,838 B1 | 3/2002 | Paul |
| 6,421,606 B1 | 7/2002 | Asai et al. |
| 6,434,530 B1 | 8/2002 | Sloane et al. |
| D468,738 S | 1/2003 | Lin |
| D469,089 S | 1/2003 | Lin |
| 6,609,103 B1 | 8/2003 | Kolls |
| 6,618,062 B1 | 9/2003 | Brown et al. |
| 6,646,659 B1 | 11/2003 | Brown et al. |
| 6,663,564 B2 | 12/2003 | Miller-Kovach et al. |
| 6,708,879 B2 | 3/2004 | Hunt |
| 6,850,907 B2 | 2/2005 | Lutnick et al. |
| 7,090,638 B2 | 8/2006 | Vidgen |
| 7,373,320 B1 | 5/2008 | Mcdonough |
| D590,396 S | 4/2009 | Lo |
| 7,584,123 B1 | 9/2009 | Karonis et al. |
| 7,634,442 B2 | 12/2009 | Alvarado et al. |
| 7,680,690 B1 | 3/2010 | Catalano |
| 7,680,770 B1 | 3/2010 | Buyukkokten et al. |
| 7,711,629 B2 | 5/2010 | Laurent et al. |
| 7,747,739 B2 | 6/2010 | Bridges et al. |
| 7,756,633 B2 | 7/2010 | Huang et al. |
| 7,788,207 B2 | 8/2010 | Alcorn et al. |
| 7,886,166 B2 | 2/2011 | Shnekendorf et al. |
| D638,879 S | 5/2011 | Suto |
| 7,987,110 B2 | 7/2011 | Cases et al. |
| 8,024,234 B1 | 9/2011 | Thomas et al. |
| 8,065,191 B2 | 11/2011 | Senior |
| D650,385 S | 12/2011 | Chiu |
| 8,121,780 B2 | 2/2012 | Gerdes et al. |
| 8,249,946 B2 | 8/2012 | Froseth et al. |
| 8,296,335 B2 | 10/2012 | Bouve et al. |
| 8,388,451 B2 | 3/2013 | Auterio et al. |
| 8,570,244 B2 | 10/2013 | Mukawa |
| 8,762,035 B2 | 6/2014 | Levine et al. |
| 8,798,593 B2 | 8/2014 | Haney |
| 8,918,411 B1 | 12/2014 | Latif et al. |
| 8,920,175 B2 | 12/2014 | Black et al. |
| 8,930,490 B2 | 1/2015 | Brown et al. |
| 8,968,099 B1 | 3/2015 | Hanke et al. |
| 9,011,153 B2 | 4/2015 | Bennett et al. |
| 9,020,763 B2 | 4/2015 | Faaborg et al. |
| 9,077,204 B2 | 7/2015 | More et al. |
| 9,092,826 B2 | 7/2015 | Deng et al. |
| 9,159,088 B2 | 10/2015 | Dillahunt et al. |
| 9,213,957 B2 | 12/2015 | Stefik et al. |
| 9,274,540 B2 | 1/2016 | Anglin et al. |
| 9,292,764 B2 | 3/2016 | Yun et al. |
| 9,387,928 B2 | 7/2016 | Gentry et al. |
| 9,389,090 B1 | 7/2016 | Levine et al. |
| 9,389,094 B2 | 7/2016 | Brenner et al. |
| 9,410,963 B2 | 8/2016 | Martin et al. |
| 9,436,923 B1 | 9/2016 | Sriram et al. |
| 9,528,972 B2 | 12/2016 | Minvielle |
| 9,558,515 B2 | 1/2017 | Babu et al. |
| 9,665,983 B2 | 5/2017 | Spivack |
| 9,880,577 B2 | 1/2018 | Dyess et al. |
| 9,952,042 B2 | 4/2018 | Abovitz et al. |
| 9,960,637 B2 | 5/2018 | Sanders et al. |
| 9,978,282 B2 | 5/2018 | Lambert et al. |
| 10,262,289 B2 | 4/2019 | Vaananen |
| 10,395,332 B1 | 8/2019 | Konrardy et al. |
| 10,403,050 B1 | 9/2019 | Beall et al. |
| 10,460,520 B2 | 10/2019 | Simpson et al. |
| 10,533,850 B2 | 1/2020 | Abovitz et al. |
| 10,586,084 B2 | 3/2020 | Burch et al. |
| 10,685,503 B2 | 6/2020 | Ricci |
| 10,737,585 B2 | 8/2020 | Chaudhary et al. |
| 10,872,381 B1 | 10/2020 | Leise et al. |
| 10,832,337 B1 | 11/2020 | Floyd et al. |
| D910,758 S | 2/2021 | Leong |
| 11,138,827 B2 | 10/2021 | Simpson |
| 11,288,563 B2 | 3/2022 | Lee et al. |
| 11,296,897 B2 | 4/2022 | Endress et al. |
| 11,298,017 B2 | 4/2022 | Tran |
| 11,298,591 B2 | 4/2022 | Evancha |
| 11,555,709 B2 * | 1/2023 | Simpson ............ G06F 16/9535 |
| 11,586,993 B2 * | 2/2023 | Handler ............ G06Q 20/127 |
| D993,316 S | 7/2023 | Lin |
| 2002/0004788 A1 | 1/2002 | Gros et al. |
| 2002/0013718 A1 * | 1/2002 | Cornwell ............ G06Q 10/02 705/5 |
| 2002/0013761 A1 * | 1/2002 | Bundy ............ G06Q 30/0623 705/37 |
| 2002/0017997 A1 | 2/2002 | Wall |
| 2002/0065738 A1 | 5/2002 | Riggs et al. |
| 2002/0065766 A1 | 5/2002 | Brown et al. |
| 2002/0133456 A1 | 9/2002 | Lancaster et al. |
| 2002/0161689 A1 * | 10/2002 | Segal ............ G06Q 40/04 705/37 |
| 2003/0055776 A1 | 3/2003 | Samuelson |
| 2003/0191725 A1 | 10/2003 | Ratliff et al. |
| 2003/0233311 A1 * | 12/2003 | Bramnick ......... G06Q 30/0601 705/26.1 |
| 2004/0019552 A1 | 1/2004 | Tobin |
| 2004/0115596 A1 | 6/2004 | Snyder et al. |
| 2004/0249742 A1 | 12/2004 | Laurent et al. |
| 2004/0260581 A1 * | 12/2004 | Baranowski ......... G06Q 40/02 705/5 |
| 2005/0021346 A1 | 1/2005 | Nadan et al. |
| 2005/0027637 A1 * | 2/2005 | Kohler .............. G06Q 40/04 705/37 |
| 2005/0132070 A1 | 6/2005 | Redlich et al. |
| 2005/0288974 A1 * | 12/2005 | Baranowski ......... G06Q 10/025 705/5 |
| 2005/0288986 A1 | 12/2005 | Barts et al. |
| 2006/0104224 A1 | 5/2006 | Singh |
| 2007/0005224 A1 | 1/2007 | Sutardja |
| 2008/0033833 A1 | 2/2008 | Senior |
| 2008/0040232 A1 * | 2/2008 | Perchthaler ............ G06Q 30/08 705/26.3 |
| 2008/0077309 A1 | 3/2008 | Cobbold |
| 2008/0129490 A1 | 6/2008 | Linville et al. |
| 2008/0140557 A1 | 6/2008 | Bowlby et al. |
| 2008/0157990 A1 | 7/2008 | Belzer et al. |
| 2008/0195432 A1 | 8/2008 | Fell et al. |
| 2008/0262892 A1 | 10/2008 | Prager et al. |
| 2009/0221338 A1 | 9/2009 | Stewart |
| 2009/0231687 A1 | 9/2009 | Yamamoto |
| 2009/0271236 A1 | 10/2009 | Ye et al. |
| 2009/0275002 A1 | 11/2009 | Hoggle |
| 2009/0276154 A1 | 11/2009 | Subramanian et al. |
| 2009/0287401 A1 | 11/2009 | Levine et al. |
| 2010/0042421 A1 | 2/2010 | Bai et al. |
| 2010/0081548 A1 | 4/2010 | Labedz |
| 2010/0114790 A1 | 5/2010 | Strimling et al. |
| 2010/0191834 A1 | 7/2010 | Zampiello |
| 2010/0211441 A1 * | 8/2010 | Sprigg ............... G06Q 30/06 705/14.1 |
| 2010/0217680 A1 * | 8/2010 | Fusz ............... G06Q 30/0601 705/26.1 |
| 2010/0228574 A1 | 9/2010 | Mundinger et al. |

(56) References Cited

U.S. PATENT DOCUMENTS

| | | |
|---|---|---|
| 2010/0280748 A1 | 11/2010 | Mundinger et al. |
| 2010/0280884 A1 | 11/2010 | Levine et al. |
| 2010/0306078 A1 | 12/2010 | Hwang |
| 2011/0025267 A1 | 2/2011 | Kamen et al. |
| 2011/0059693 A1 | 3/2011 | O'Sullivan |
| 2011/0098056 A1 | 4/2011 | Rhoads et al. |
| 2011/0106660 A1 | 5/2011 | Ajjarapu et al. |
| 2011/0202418 A1 | 8/2011 | Kempton et al. |
| 2012/0023032 A1 | 1/2012 | Visdomini |
| 2012/0075067 A1 | 3/2012 | Attaluri |
| 2012/0078743 A1 | 3/2012 | Betancourt |
| 2012/0101629 A1 | 4/2012 | Olsen et al. |
| 2012/0158762 A1 | 6/2012 | IwuchukWu |
| 2012/0303259 A1 | 11/2012 | Prosser |
| 2012/0323645 A1 | 12/2012 | Spiegel et al. |
| 2013/0024041 A1 | 1/2013 | Golden et al. |
| 2013/0147820 A1 | 6/2013 | Kalai et al. |
| 2013/0173326 A1 | 7/2013 | Anglin et al. |
| 2013/0179205 A1 | 7/2013 | Slinin |
| 2013/0191237 A1 | 7/2013 | Tenorio |
| 2013/0211863 A1* | 8/2013 | White ............... G06Q 30/08 705/5 |
| 2013/0265174 A1 | 10/2013 | Scofield et al. |
| 2013/0268325 A1 | 10/2013 | Dembo |
| 2013/0275156 A1 | 10/2013 | Kinkaid et al. |
| 2013/0304522 A1* | 11/2013 | Cundle ............... G06Q 50/14 705/5 |
| 2013/0311264 A1 | 11/2013 | Solomon et al. |
| 2014/0038781 A1 | 2/2014 | Foley |
| 2014/0075528 A1 | 3/2014 | Matsuoka |
| 2014/0098009 A1 | 4/2014 | Prest et al. |
| 2014/0122190 A1 | 5/2014 | Wolfson et al. |
| 2014/0129302 A1 | 5/2014 | Amin et al. |
| 2014/0149157 A1 | 5/2014 | Shaam et al. |
| 2014/0162598 A1 | 6/2014 | Villa-Real |
| 2014/0220516 A1 | 8/2014 | Marshall et al. |
| 2014/0229258 A1 | 8/2014 | Seriani |
| 2014/0236641 A1* | 8/2014 | Dawkins ............... G06Q 30/06 705/5 |
| 2014/0244413 A1 | 8/2014 | Senior |
| 2014/0310019 A1 | 10/2014 | Blander et al. |
| 2014/0324633 A1 | 10/2014 | Pollak et al. |
| 2014/0349672 A1 | 11/2014 | Kern et al. |
| 2015/0006428 A1 | 1/2015 | Miller et al. |
| 2015/0016777 A1 | 1/2015 | Abovitz et al. |
| 2015/0058051 A1 | 2/2015 | Movshovich |
| 2015/0097864 A1 | 4/2015 | Alaniz |
| 2015/0161564 A1 | 6/2015 | Sweeney et al. |
| 2015/0178642 A1 | 6/2015 | Abboud |
| 2015/0198459 A1 | 7/2015 | MacNeille et al. |
| 2015/0206443 A1 | 7/2015 | Aylesworth et al. |
| 2015/0220916 A1 | 8/2015 | Prakash et al. |
| 2015/0241236 A1 | 8/2015 | Slusar et al. |
| 2015/0248689 A1 | 9/2015 | Paul et al. |
| 2015/0260474 A1 | 9/2015 | Rublowsky et al. |
| 2015/0269865 A1 | 9/2015 | Volach et al. |
| 2015/0324831 A1 | 11/2015 | Barua et al. |
| 2015/0348282 A1 | 12/2015 | Gibbon et al. |
| 2015/0371186 A1 | 12/2015 | Podgurny et al. |
| 2016/0041628 A1 | 2/2016 | Verma |
| 2016/0117657 A1 | 4/2016 | Forbes, Jr. et al. |
| 2016/0117756 A1 | 4/2016 | Carr et al. |
| 2016/0162989 A1 | 6/2016 | Cole et al. |
| 2016/0171891 A1 | 6/2016 | Banatwala et al. |
| 2016/0203422 A1 | 7/2016 | Demarchi et al. |
| 2016/0224935 A1 | 8/2016 | Burnett |
| 2016/0225115 A1 | 8/2016 | Levy et al. |
| 2016/0307276 A1 | 9/2016 | Young |
| 2016/0297316 A1 | 10/2016 | Penilla et al. |
| 2016/0300296 A1* | 10/2016 | Alonso Cembrano ............... G06Q 30/08 |
| 2016/0307288 A1 | 10/2016 | Yehuda et al. |
| 2016/0307373 A1 | 10/2016 | Dean et al. |
| 2016/0321609 A1 | 11/2016 | Dube et al. |
| 2016/0349835 A1 | 12/2016 | Shapira |
| 2016/0364679 A1 | 12/2016 | Cao |
| 2017/0019496 A1 | 1/2017 | Orbach |
| 2017/0039770 A1 | 2/2017 | Lanier et al. |
| 2017/0046658 A1 | 2/2017 | Jones et al. |
| 2017/0046664 A1 | 2/2017 | Haldenby et al. |
| 2017/0046799 A1 | 2/2017 | Chan et al. |
| 2017/0046806 A1 | 2/2017 | Haldenby et al. |
| 2017/0048216 A1 | 2/2017 | Chow et al. |
| 2017/0061509 A1 | 3/2017 | Rosenberg et al. |
| 2017/0089710 A1 | 3/2017 | Slusar |
| 2017/0122746 A1 | 5/2017 | Howard et al. |
| 2017/0146360 A1 | 5/2017 | Averbuch |
| 2017/0232300 A1 | 8/2017 | Tran et al. |
| 2017/0243286 A1 | 8/2017 | Castinado et al. |
| 2017/0243310 A1* | 8/2017 | Dawkins ............... G06Q 10/02 |
| 2017/0249626 A1 | 8/2017 | Marlatt |
| 2017/0276500 A1 | 9/2017 | Margalit et al. |
| 2017/0293881 A1 | 10/2017 | Narkulla |
| 2017/0293950 A1 | 10/2017 | Rathod |
| 2017/0330274 A1 | 11/2017 | Conant, II et al. |
| 2018/0012149 A1 | 1/2018 | Yust |
| 2018/0013211 A1 | 1/2018 | Ricci |
| 2018/0025417 A1 | 1/2018 | Brathwaite et al. |
| 2018/0046431 A1 | 2/2018 | Thagadur Shivappa et al. |
| 2018/0053226 A1 | 2/2018 | Hutton et al. |
| 2018/0053237 A1 | 2/2018 | Hayes et al. |
| 2018/0068355 A1 | 3/2018 | Garry |
| 2018/0075695 A1 | 3/2018 | Simpson |
| 2018/0095471 A1 | 4/2018 | Allan et al. |
| 2018/0102053 A1 | 4/2018 | Hillman et al. |
| 2018/0111494 A1 | 4/2018 | Penilla et al. |
| 2018/0117447 A1 | 5/2018 | Bao et al. |
| 2018/0121958 A1 | 5/2018 | Aist et al. |
| 2018/0129276 A1 | 5/2018 | Nguyen et al. |
| 2018/0140903 A1 | 5/2018 | Poure |
| 2018/0143029 A1 | 5/2018 | Nikulin et al. |
| 2018/0157999 A1 | 6/2018 | Arora |
| 2018/0173800 A1 | 6/2018 | Chang et al. |
| 2018/0240542 A1 | 8/2018 | Grimmer |
| 2018/0278984 A1 | 9/2018 | Aimone et al. |
| 2018/0293638 A1 | 10/2018 | Simpson |
| 2018/0313798 A1 | 11/2018 | Chokshi et al. |
| 2018/0342106 A1 | 11/2018 | Rosado |
| 2018/0348863 A1 | 12/2018 | Aimone et al. |
| 2018/0357899 A1 | 12/2018 | Krivacic et al. |
| 2018/0365598 A1 | 12/2018 | Jamail |
| 2018/0365904 A1 | 12/2018 | Holmes |
| 2018/0374268 A1 | 12/2018 | Niles |
| 2019/0047427 A1 | 2/2019 | Pogorelik |
| 2019/0050634 A1 | 2/2019 | Nerayoff et al. |
| 2019/0066528 A1 | 2/2019 | Hwang et al. |
| 2019/0102946 A1 | 4/2019 | Spivack et al. |
| 2019/0108686 A1 | 4/2019 | Spivack et al. |
| 2019/0139448 A1 | 5/2019 | Marshall et al. |
| 2019/0143828 A1 | 5/2019 | Sawada et al. |
| 2019/0146974 A1 | 5/2019 | Chung et al. |
| 2019/0158603 A1 | 5/2019 | Nelson et al. |
| 2019/0160958 A1 | 5/2019 | Chaudhary et al. |
| 2019/0178654 A1 | 6/2019 | Hare |
| 2019/0188450 A1 | 6/2019 | Spivack et al. |
| 2019/0205798 A1 | 7/2019 | Rosas-Maxemin et al. |
| 2019/0228269 A1 | 7/2019 | Brent et al. |
| 2019/0236741 A1 | 8/2019 | Bowman et al. |
| 2019/0236742 A1 | 8/2019 | Tomskii et al. |
| 2019/0271553 A1 | 9/2019 | Simpson |
| 2019/0318286 A1 | 10/2019 | Simpson |
| 2019/0333166 A1 | 10/2019 | Simpson |
| 2019/0333181 A1 | 10/2019 | Simpson |
| 2019/0353499 A1 | 11/2019 | Stenneth |
| 2020/0013498 A1* | 1/2020 | Gelber ............... G06Q 30/08 |
| 2020/0027096 A1 | 1/2020 | Cooner |
| 2020/0047055 A1 | 2/2020 | Ward |
| 2020/0098071 A1 | 3/2020 | Jackson |
| 2020/0125999 A1 | 4/2020 | Simpson |
| 2020/0151816 A1 | 5/2020 | Simpson |
| 2020/0156495 A1 | 5/2020 | Lindup |
| 2020/0160461 A1 | 5/2020 | Kaniki |
| 2020/0173808 A1 | 6/2020 | Beaurepaire et al. |
| 2020/0317074 A1 | 10/2020 | Miller et al. |

(56) References Cited

U.S. PATENT DOCUMENTS

| | | |
|---|---|---|
| 2020/0317075 A1 | 10/2020 | Yokoyama et al. |
| 2020/0389301 A1 | 12/2020 | Detres et al. |
| 2021/0012278 A1 | 1/2021 | Alon et al. |
| 2021/0379447 A1 | 12/2021 | Lee |
| 2022/0020073 A1 | 1/2022 | Farmer |
| 2022/0068081 A1 | 3/2022 | Pariseau |
| 2022/0100731 A1 | 3/2022 | Tirapu Azpiroz et al. |
| 2022/0122026 A1 | 4/2022 | Okabe et al. |
| 2023/0377409 A1 | 11/2023 | Rye |

FOREIGN PATENT DOCUMENTS

| | | |
|---|---|---|
| JP | 2003177034 A | 12/2001 |
| WO | 2001041084 A2 | 6/2001 |
| WO | 2015059691 A1 | 4/2015 |
| WO | 2015161307 A1 | 4/2015 |
| WO | 2018024844 A1 | 2/2018 |
| WO | 2019/134005 A1 | 7/2019 |
| WO | 2019183468 A1 | 9/2019 |
| WO | 2021/163675 A1 | 8/2021 |

OTHER PUBLICATIONS

PCT International Search Report and Written Opinion; PCT/US2020/023223; dated Jun. 19, 2020.
PCT International Search Report and Written Opinion; PCT/US2020/023729; dated Jun. 18, 2020.
PCT International Search Report and Written Opinion; PCT/US2020/021546; dated Jun. 8, 2020.
PCT International Search Report and Written Opinion; PCT/US2020/018012; dated Apr. 21, 2020.
PCT International Search Report and Written Opinion; PCT/US2020/012208; dated Mar. 24, 2020.
Westerman; Longitudinal Analysis of Biomarker Data from a Personalized Nutrition Platform in Healthy Subjects; Nature, Scientific Reports; vol. 8; Oct. 2, 2018 (retrieved Jun. 10, 2020).
Ahmed, et al.; Energy Trading with Electric Vehicles in Smart Campus Parking Lots; Applied Sciences; Sep. 7, 2018.
Fitzsimmons; Uber Hit with Cap as New York City Takes Lead in Crackdown; New York Times; Aug. 8, 2018 (retrieved Feb. 29, 2020). https://www.wral.com/uber-hit-with-cap-as-new-york-city-takes-lead-in-crackdow/17755819/?version=amp?
Peters, et al.; Student Support Services for Online Learning Re-Imagined and Re-Invigorated: Then, Now and What's To Come; Contact North | Contact Nord; Sep. 2017.
Soccer ball-shaped drone might be the safest flying robot yet https://mashable.com/2015/12/21/soccer-ball-drone/ ; Dec. 21, 2015.
Fleishman; Use Parking Apps to Find Lots, Garages, Valet, and Meters; Macworld; Jul. 19, 2015.
Borras, et al. Intelligent Tourism Reminder Systems: A Survey; Expert Systems with Applications 41; Elsevier; Jun. 9, 2014.
Pentland; After Decades of Doubt, Deregulation Delivers Lower Electricity Rates; Forbes; Oct. 1, 20133 (retrieved Feb. 29, 2020). https://www.forbes.com/sites/williampentland/2013/10/13/after-decades-of-doubt-deregulation-delivers-lower-electricity-prices/#201d4a9c1d13.
Sun, et al.; Real-Time MUAV Video Augmentation with Geo-Information for Remote Monitoring; 2013 Fifth International Conference on Geo-Information Technologies for Natural Disaster Management; pp. 114-118; IEEE; 2013.
U.S. Appl. No. 60/035,205; filed Jan. 10, 1997; Page.
The Wayback Machine, Interest Rate Swaps, https://web.archive.org/web/20171006212154/https://global.pimco.com/en/gbl/resources/education/understanding-interest-rate-swaps, 2016, pp. 1-7.
Freight Derivatives—a Vital Tool For YOur Business, https://www.reedsmith.com/-/media/files/perspectives/2007/02/freight-derivatives--a-vital-tool-for-your-business/files/freight-derivatives--a vital-tool-for-your-business/fileattachment/etcfreightderivativesavitaltoolforyourbusiness.pdf (Year: 2007), Energy, Trade & Commodities, pp. 1-3.
Barry, Kieth, App lets drivers auction public parking spaces, Wired, Aug. 11, 2011, pp. 1-4.
Jiang, Landu, et al., Sun Chase: Energy-Efficient Route Planning for solar-powered Evs, IEEE 37th international conference on distrubuted computing systems, 2017, pp. 1-11.
Netlingo, https://web.archive.org/web/20170122184857/https://www.netlingo.com/word/electronic-exchange.php,dated Oct. 22, 2017.
Laseter, Tim, "B2B benchmark: The State of Electronic Exchanges", Tech & Innovation, dated Oct. 1, 2001.
Directed Graph, https://en.wikipedia.org/wiki/Directed_graph, pp. 1-6, 2022.
About IBM Food Trust, https://www.ibm.com/downloads/cas/E9DBNDJG, pp. 1-17, 2019.
IBM Blockchain Transparent Supply, https://www.ibm.com/downloads/cas/BKQDKOM2, pp. 1-14, Aug. 2020.
Radocchia, Samantha, 3 Innovative Ways Blockchain Will Build Trust In The Food Industry, https://www.forbes.com/sites/samantharadocchia/2018/04/26/3-innovative-ways-blockchain-will-build-trust-in-the-food-industry/?sh=65bc79f42afc, Forbes, pp. 1-5, Apr. 26, 2018.
Change the World, https://fortune.com/change-the-world/2019/IBM/, Fortune Media IP Limited, pp. 1-5, 2022.
IBM Food Trust, https://www.constellationr.com/node/17601/vote/application/view/588, Constellation Research Inc., pp. 1-4, 2010-2022.
Dey, Somdip, et al., FoodSQRBlock: Digitizing Food Production and the Supply Chain with Blockchain and QR Code in the Cloud, https://www.mdpi.com/2071-1050/13/6/3486/htm, MDPI, pp. 1-27, Mar. 22, 2021.
Ramasubramanian, Vasant, "Quadrasense: Immersive UAV-based cross-reality environmental sensor networks," phD diss., Massachusetts Institute of Technology, pp. 1-75, 2015.
Wyzant, https://web.archive.org/web/20190327185429/https://www.wyzant.com/hotitworks/students, Wyzant tutoring, pp. 1-13 , Mar. 27, 2019.
PCT International Search Report and Written Opinion; PCT/US2021/065855; dated Mar. 2, 20229.
PCT International Search Report and Written Opinion; PCT/US2022/012717; dated Mar. 3, 20220.
Zhao, et al., Incentives in Ridesharing with Deficit Control, Proceedings of the 13th International Conference on Autonomous Agents and Multiagent Systems (AAMAS 2014), May 5-9, 2014, pp. 1021-1028.
Little, T.D., et al., On the Joys of Missing Data, Journal of pediatric psychology, 2014, pp. 151-162.
Honaker, J., et al., What to do About Missing Values in Time-Series Cross-Section Data, American Journal of Political Science, Sep. 6, 2008, pp. 561-581.
Westerhoff, Market Depth and Price Dynamics: A Note, University of Osnabrueck, Department of Economics Rolandstrasse 8, D-49069 Osnabrueck, German, Mar. 30, 2004, pp. 1-8.
PCT International Search Report and Written Opinion; PCTUS2022/051998; dated Mar. 8, 2023.
EP23153137.7 European Search Report, dated May 2, 20234, pp. 1-10.
EP20787830.7 European Search Report, dated May 12, 2023, pp. 1-10.
Zheyong, Bian, et al., "Planning the Ridesharing Route for the First-Mile Service Linking to Railway Passenger Transportation," Joint Rail Conference, Apr. 2017, pp. 1-11.
EP23168879.7 European Search Report, dated Jul. 5, 2023, pp. 1-13.
Papa, U., & Del Core, G., "Design of Sonar Sensor Model for Safe Landing of an UAV," IEEE Metrology for Aerospace, 2015, pp. 346-350.
PCT International Search Report and Written Opinion; PCT/US2022/027077; Nov. 1, 2022.
Wei, et al. "impact of aircraft size and seat availability on airlines demand and market share in duopoly markets" Published by Elsevier, 2005, pp. 315-327.
PCT International Search Report and Written Opinion; PCT/US2022/052969; Mar. 21, 2023.
Li, Jundong, et al., "Multi-network Embedding", pp. 1-9, 2018.

(56) References Cited

OTHER PUBLICATIONS

Speediance, All-in-One Smart Home Gym; retrieved from internet: https://www.amazon.com/Speediance-Equipment-Resistance-Training-Machine-Works/dp/B0C4KF7844/?th=1; May 8, 2023; p. 1.
Freebeat, Smart Exercise Bike; retrieved from internet: https://www.amazon.com/Resistance-Cushioned-Detection-Altorithm-Instructors/dp/B0BZKKZ6B3/?th=1; Mar. 3, 2023; p. 1.
Aratani, Lori, "This app wants to reward you for smart commuting choices," The Washington Post, Aug. 18, 2018, pp. 1-3.

\* cited by examiner

IMPLEMENTATIONS OF A COMPUTERIZED BUSINESS TRANSACTION EXCHANGE FOR VARIOUS USERS

RELATED APPLICATIONS

This application is a continuation of U.S. patent application Ser. No. 15/266,326, filed 2016 Sep. 15, and the entire disclosure of which is incorporated herein by reference in its entirety.

BACKGROUND OF THE INVENTION

Field of the Invention

Implementations of various methods and systems in a social network and reality game which includes reality, virtual reality and mixed reality to create a network of users that are rewarded for considering the real world economic impact of economic choices on the global economy rather than the isolated economic impact of choices on the local or national economy. The global economic network and game will provide implementations of various methods of incentives in various sub-categories of the real world economy that will allow users economic advancement in the economic network community for making choices that provide a higher level of economic utility for the global network economy. Implementations of methods will occur in various modules considering, but not limited to transportation, freight, housing, education, agriculture, services, automobiles, commodities, banking, mining, energy, clothing, consumer goods, healthcare and technology. The network of users will be directly connected by an implementation of a system that allows users in one part of the network to see how their choices affect both their part of the network as well as other parts of the network. The implementation of the system will implement various methods that will reward behavior that improves the overall global network of users and their associated connectivity, not just the local network or national network of users. The claimed subject matter is not limited to the following example to solve noted disadvantages of the current system: Network users or game players of the methods will be rewarded to become "global citizens" that learn by way of example a choice to reduce fuel consumption in America by ride sharing in the network would build a water well for network users in Africa. The user reward will allow the user to actually participate virtually or physically in a team of users that would build the water well for the network user community in Africa with the reward funding. The network or game user would actually be involved in the real world charity investment project and the database tracks the project in the context of the real world and the augmented, mixed and virtual reality.

DESCRIPTION OF THE RELATED ART

The following descriptions and examples are not admitted to be prior art by virtue of their inclusion within this section.

The current economic system and global network generally assumes that the economic choice with the highest level of utility and highest level of efficiency is one governed by acting in self-interest with competition. Modern economic game theory suggests that the former assumption can be improved by acting in self interest in an atmosphere of competition but by also considering the economic outcome for the group as well as self-interest. Most participants in the current economic system simply do not know how their choices affect others in the system, especially that choices in the developed world may affect disproportionately the outcomes for those in the undeveloped world. The current system is not linked and therefore sub-optimal economic outcomes are achieved because there are limited governing mechanisms to consider the global group outcome. One implementation of this global network of users and game players may have a system that will reward economic choices in one domain that improve both their domain and the domain of other users in the system. The implementation of this system will link and bridge the global user base and further, the implementation of the system will introduce competition to sharing in a way that does not make competition and sharing mutually exclusive or independent ideas.

Implementations of methods have been made in systems that consider local economic utility but do not connect global outcomes in their solutions such as the following patents:

1) U.S. Pat. No. 6,175,831 issued Jan. 16, 2001 to Weinreich, et al. covers methods and apparatus for constructing a networking database and system. This patent method has not applied an incentive system in the form of a game or economic transactions to invest in charity or undeveloped parts of the global economy. Further this patent does not link the real world methods inside of a reality game incentive structure. The additional improvement is utilizing a relational database to perform a method of linking end use charity projects and people to donors through their business transactions in a strategic game format.
2) U.S. Pat. No. 8,968,099 issued Mar. 3, 2015 to Hanke, et al. covers system and methods for transporting virtual objects in a parallel reality game. This patent method covers transporting virtual objects whereas the improvement method is transporting actual physical representation of not virtual objects, but rather real people and a method of connecting and interacting with real world charity investment issues, people and problems in a strategic game format. Further the aforementioned patent does not address linking the everyday business transactions of users with charity project development work.
3) U.S. Pat. No. 8,388,451 issued Mar. 5, 2013 to Auterio, et al. covers game-based incentives for location-based actions. This patent covers in game rewards for computer implemented games. The improvement is both a game that has a strategy to help real world situations and the incentives are not only in game rewards, but also actual physical resources which will be deployed to the real world situation.
4) U.S. Pat. No. 9,092,826 issued Jul. 28, 2015 to Deng, et al. covers a method for using a social networking system to connect users by computer algorithms based on stored user biographical profiles to connect with each other or display their profiles to each other based on associated information. The improvement and difference in the method and system is that the association between users on the network will be linked by a charitable investment to one user on behalf of another user from a charity profile in the social database and game engine system. Further the system provides the ability for users to interact through reality, virtual reality or mixed reality with respect to their linkage through the charitable investment and everyday business transactions.

SUMMARY

Described herein are implementations of various systems and methods for using a social network, a game engine network and a network to provide users of the networks the ability to integrate their everyday personal and business transactions with charity projects and people globally. Users of the methods on the network will use a reality based game strategy and structure through the use of reality, augmented reality and mixed reality technologies to integrate and link their everyday tasks of personal and business transactions to charity network projects and users in an invention that formerly did not exist. Implementations of methods described herein will link people who need help with those who transact or participate on the system in everyday business transactions. Implementations of methods for users will then have a scrapbook of how their everyday common tasks and transactions added up in a record that truly changed the world and influenced people towards social good.

The claimed subject matter is not limited to implementations that solve any or all of the noted disadvantages. Further, the summary section is provided to introduce a selection of concepts in a simplified form that are further described below in the detailed description section. The summary section is not intended to identify key features or essential features of the claimed subject matter, nor is it intended to be used to limit the scope of the claimed subject matter.

BRIEF DESCRIPTION OF THE DRAWINGS

Implementations of various technologies will hereafter be described with reference to the accompanying drawings. It should be understood, however, that the accompanying drawings illustrate only the various implementations described herein and are not meant to limit the scope of various technologies described herein.

DETAILED DESCRIPTION

In the following description, for the purposes of explanation, numerous specific details are set forth in order to provide a thorough understanding of embodiments of the invention. It will be apparent, however to one skilled in the art that these embodiments may be practiced without some of the specific details. Embodiments of the invention described herein are implementations of various technologies and methods for determining a global network economic outcome which considers the entire global network of users rather than a single user or a small group of users of the global system. In one implementation economic efficiency implies an economic state in which every resource is optimally allocated to serve each individual or entity in the best way while minimizing waste and inefficiency. When an economy is economically efficient, any changes made to assist one entity would harm another. In terms of production, goods are produced at their lowest possible cost, as are the variable inputs of production. The principles of economic efficiency are based on the concept that resources are scarce. Therefore, there are not enough resources to have all aspects of an economy functioning at their highest capacity at all times. Instead, the scarce resources must be distributed to meet the needs of the economy in an ideal way while also limiting the amount of waste produced. The ideal state is related to the welfare of the population as a whole with peak efficiency also resulting in the highest level of welfare possible based on the resources available.

The invention is a series of implementations of various methods of a comprehensive reality game in reality, augmented reality, mixed reality and virtual reality to match actual charity based projects and people who have needs within charities (i.e. charity clients) with business transactions executed by donors as well as directly linking the projects and clients to the donors in a relational interactive database and social network.

Overall Network

Figure 1:
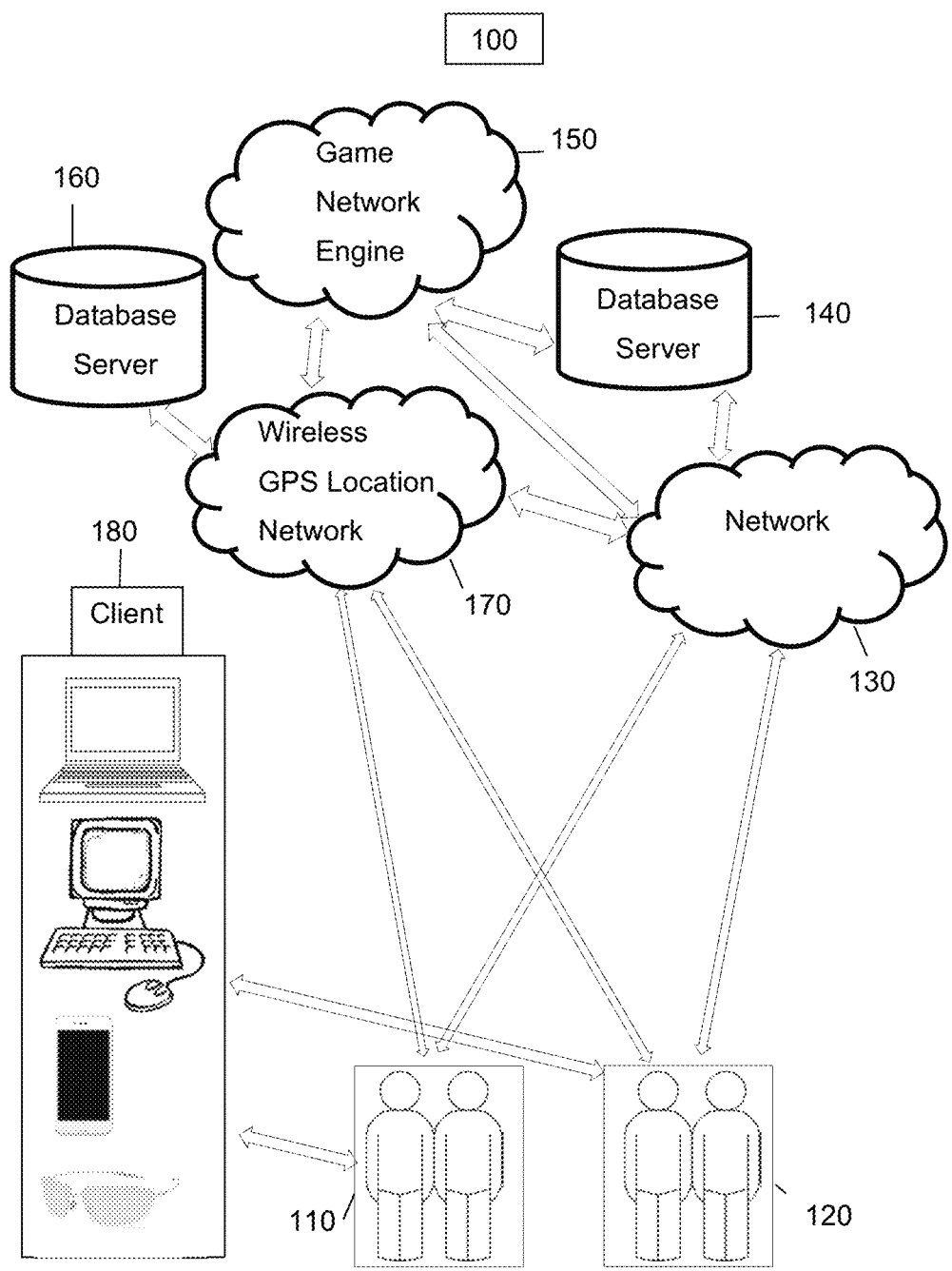
FIG. 1 illustrates a schematic diagram of methods considering reality network game communities, augmented reality, mixed reality for connecting real people in developing countries with players of the game in various business transactions and game states.

Embodiments of the invention may be implemented within a networking architecture such as illustrated in FIG. 1. The particular embodiment shown in FIG. 1 includes a client device 180 for executing transactions on the system 100 as well as participating on the social network 130 and/or game network 150. The client devices 180 may be used for both the plurality of users who are donors 110 and for the plurality of users who are charity clients 120. Furthermore the plurality of users may be donors 110 and charity clients 120 at the same time as the embodiments are not mutually exclusive. The overall system 100 and network may operate with both a network 130 and a wireless GPS network 170 which interact with a game network engine 150 as well as a plurality of servers 160 and 140 which may host various data for social networking, game play, game strategy, game achievement, charity client projects, business transaction modules and other implementations and variations of the embodiment. Each client 180 may present many formats for the social network, business transactions and game strategy. The formats for each client 180 are not limited to the proposed clients 180, but for the purpose of example may be in the form of a laptop computer, a desktop computer, a hand held mobile computing device, a head set mobile computing device or even a projection based computing device. Users 110 who transact or network on the system 100 who are then connected to charity clients 120 of the network may have access to each other through a real name or a user alias.

The social network and network 130 may use a social network engine such as elgg, drupal, dolphin or a customized social network solution to connect users. Users 110 may upload a basic profile into the system which allows them network access rights and an account on the system that may be used for gaming, social networking and connecting with charity users 120 on the system 100. The Global Positioning System ("GPS") wireless network 170 allows users 110 and charity users 120 to connect in business transactions on the network 130 and to interact with various game states deployed by the game network engine 150 with virtual reality, reality and mixed reality imports of users 110 into the world of charity users 120 and for charity users 120 to import users 110 into their world. Various game states may exist in reality, virtual reality, augmented reality and mixed reality that are produced by the game network engine 150 for users 110 and charity users 120 through their clients 180.

The typical database server 160 and 140 deployment may be in MySQL or Oracle using Open Database Connectivity ("ODBC") protocol. Other scripting languages may also be deployed to connect network users and to facilitate business transactions and tracking the work of charity deployment.

Figure 2:
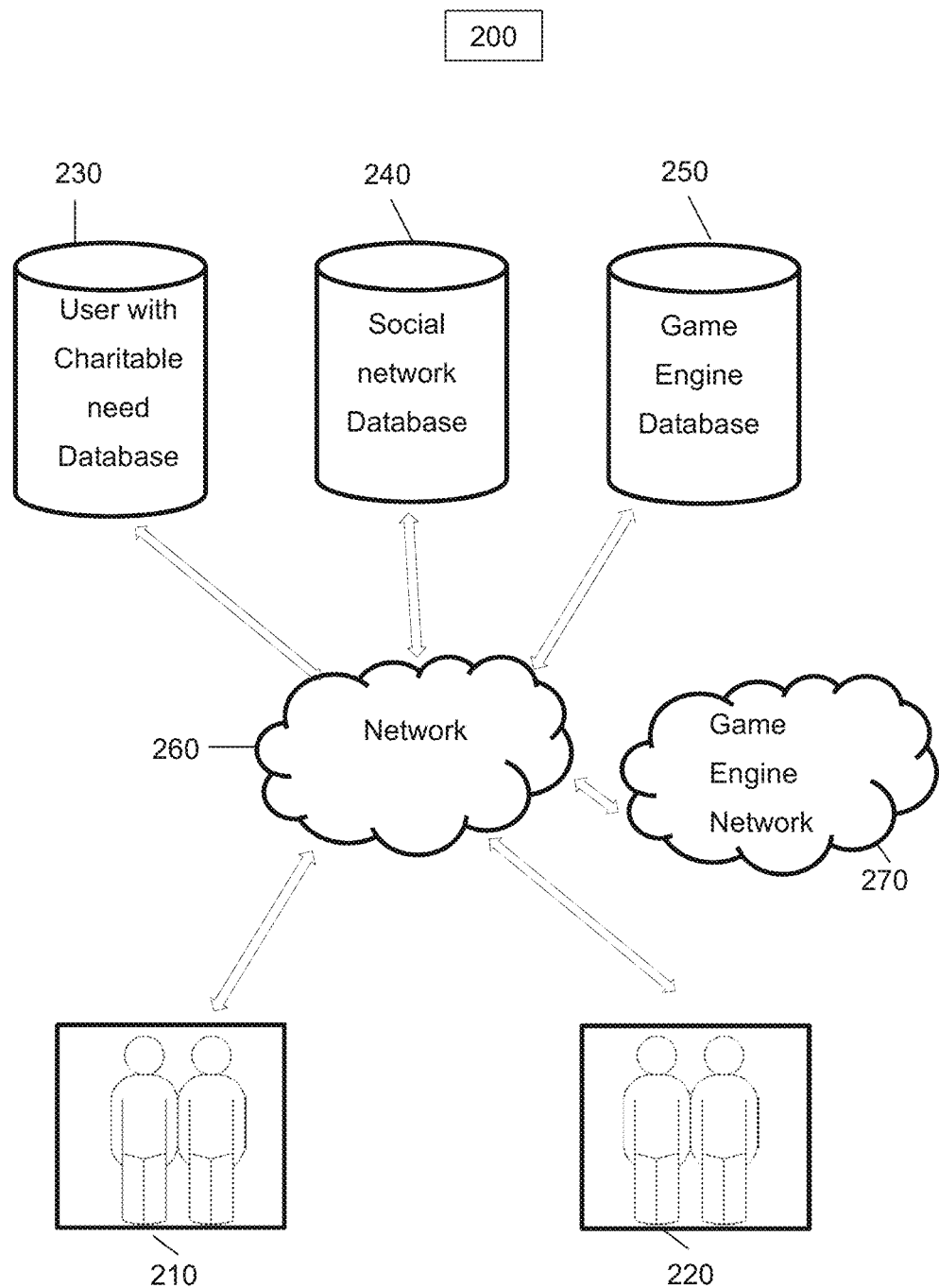
FIG. 2 illustrates a schematic diagram of methods considering further interactions between the charity database, social network database, game engine database, network, users and the game engine network.

Additional details regarding the database structure are illustrated in FIG. 2 as well as FIG. 1. In one embodiment, a database 230 may be used to document and track all the charity projects across the system 100. One record in the charity database 230 may be a water well in Segou, Mali. The charity users 220 of the network are associated with the water well project in Segou, Mali through the network 260 and the match of a charity user 220 with the charitable project database 230. Users who may have made a business transaction on the network 260 will have an allocation of points or incentives or rewards placed in the game engine database 250 through interaction between the network 260 and game engine network 270 associated with the users 210 and their associated game engine account record in the game engine database 250. Accordingly user 210 may be paired with a charity user 220. User 210 may communicate with charity user 220 through the network 260. The system may have the capability of direct translation of language through the network 260 so that communication can occur in the native language of user 210 and user 220.

Figure 3:
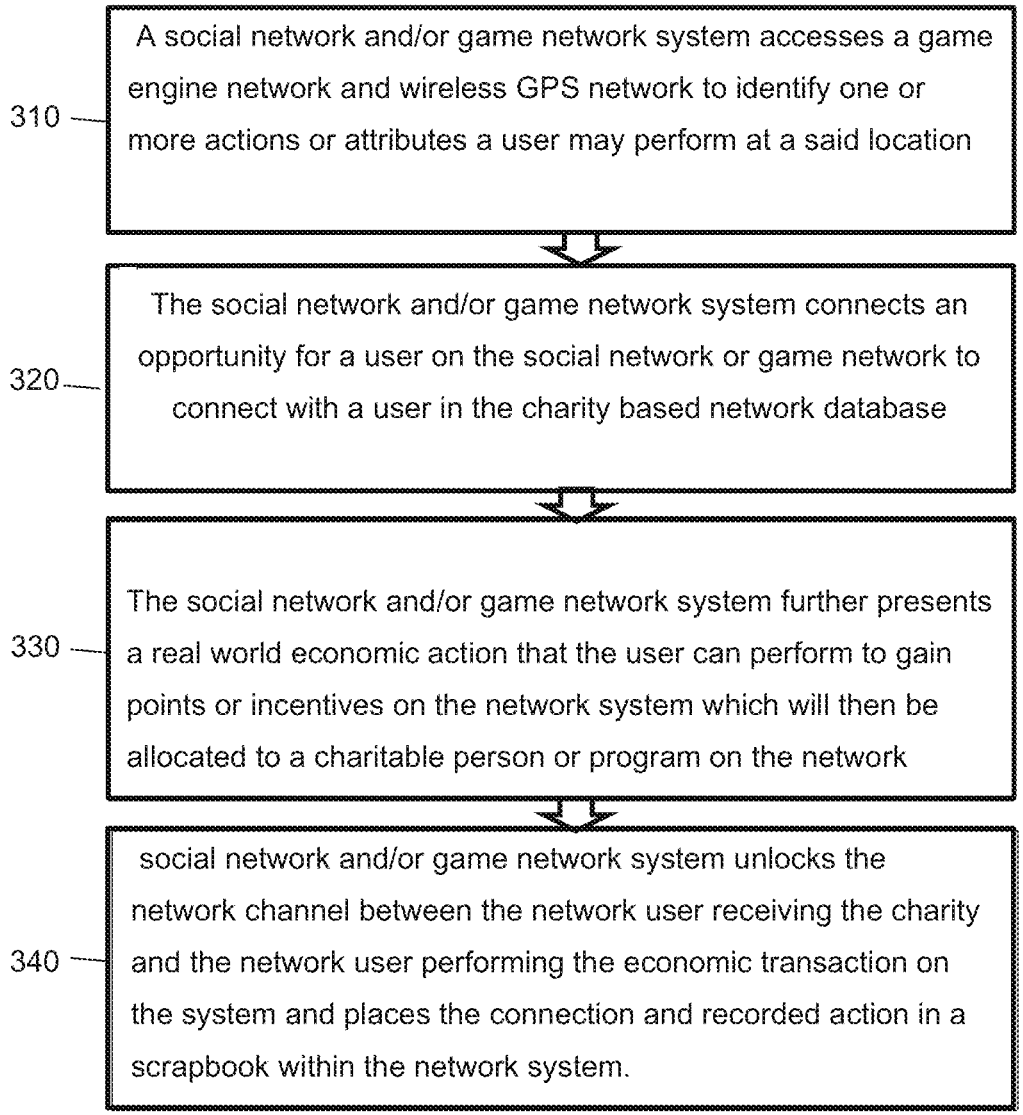
FIG. 3 is a flow chart of a method according to one embodiment of the invention.

Flow of Social Network, Game Strategy, Business Transaction and Link Between Users Who are Transacting Business to Donate and Users Who are Receiving the Charity FIG. 3 depicts a flow chart 300 or schematic 300 of a series of steps and interactions of various pieces of the system 100. In some embodiments (Step 310) a user 110 of the social network 170 may commence game play or network 130 interaction which may incite an action from the game network engine 150 and the game engine database 250. Further the network may identify location of the user 110 through connection with the GPS Location Network 170. The Game network engine 270 may then identify business opportunities at a specific location (Step 320 and Step 330). A user 110 may also utilize various modules of the game engine network 270 and game engine database 250 to start various applications that the user may need for everyday life. One example of a module or embodiment of a business transaction may be searching for food. A user 110 may see a virtual user 120 that has been sponsored by a participating business such as McDonalds. McDonalds may have funded a virtual character or a real character or charity user 120 that has been transported into the augmented reality to a client 180 while a user 110 may be participating in the game (Step 330). The user 110 may be inclined to link with the virtual character or real character or charity user 120 by buying a good or service at McDonalds. If the user 110 makes a transaction at McDonalds, then the user is linked with points or rewards to the charity user 120 in such a way that the charity user 120 is helped (Step 330). In Step 340, the business transaction and the link with the charity user 120 and user 110 is logged in the Charity database 230, Social Network database 240 and Game engine database 250. A scrapbook collection or record of all the users 110 transactions and links to charity users 120 is kept by the game engine database such that the user 110 may review the projects they have participated in over the life of the user 110 account. Also the status of the charity project in the charity database 230 has a record for progress of the charity project. An embodiment of this data may be the status of the water well in Segou, Mali which has been linked to users 110 and charity users 120. Business transactions in the system 100 may include transactions in economic sectors such as ride sharing, transportation, freight, housing, education, agriculture, services, automobiles, commodities, banking, mining, energy, clothing, consumer goods, healthcare and technology. The game engine network 270 interacts with the game engine database 250 through the network 250 and client devices 180 to alert the user 110 of various game states, levels that have been unlocked and rewards that are available to the user. Rewards are allocated to various charity users 220 by users 210 and by the user with charitable need database 230.

Figure 4:
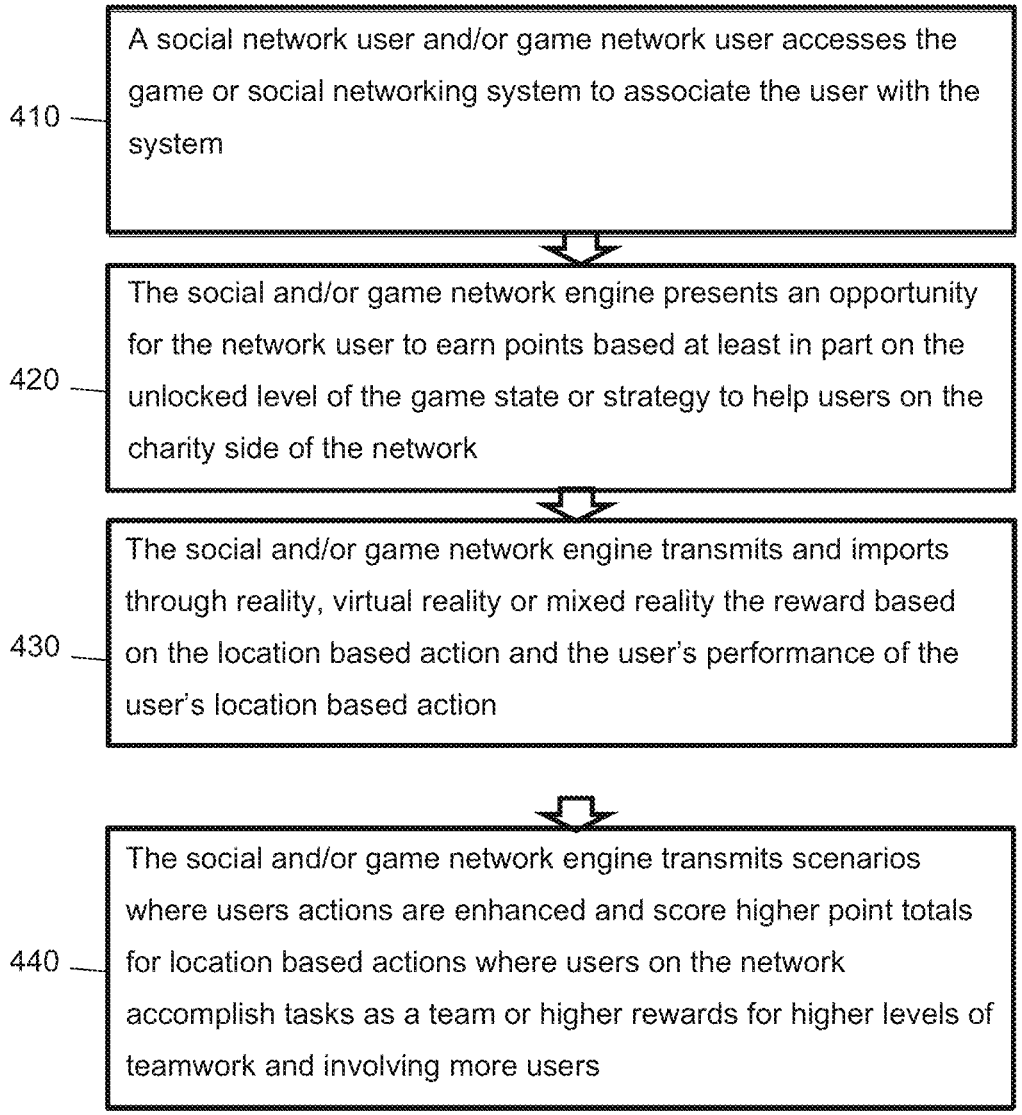
FIG. 4 is a flow chart of a method of an incentive and game state for a user of the system to help another user in the charity state of the network.

The steps listed on FIG. 4 resemble FIG. 3, but add the elements of teamwork in the game strategy and the presence of various states of technology from various clients 180. In Step 410, the user 110 accesses the social network 130 and game network engine 150 to associate the user 110 with their account. As the game progresses the game network engine 270 interacts with the game engine database 250 through the network 260. Step 420 explains further how different levels of the game can be unlocked to allow users 110 to accomplish greater charity work or development work for charity users 120. Implicit with step 420 is that more points create greater opportunities to help charity users 120 for users 110. The more a user 110 utilizes transactions in their everyday life in various modules on the overall system 100, the more points or rewards they will earn to accomplish a larger network of charity work globally. Step 430 explains how the business transactions may be fully integrated with game play on the system 100. The network 260 may transmit the reward points earned as well as link the charity user 120 with the user 110 who transacted on the system 100. The game engine database 250 and game engine network 270 may use various client 180 technology formats to display and connect users 110 with charity users 120. The technology formats of lap tops, desktops, mobile computing devices and head mounted computing devices as well as projection based computing devices may be utilized to connect people across the world in a way that has not been done before with the full integration of business transactions on a system with charity work in real time. Step 440 further explains the reward system that may incent teamwork and resource sharing between users 110 to provide higher utility to users 110 and charity users 120.

Figure 5:
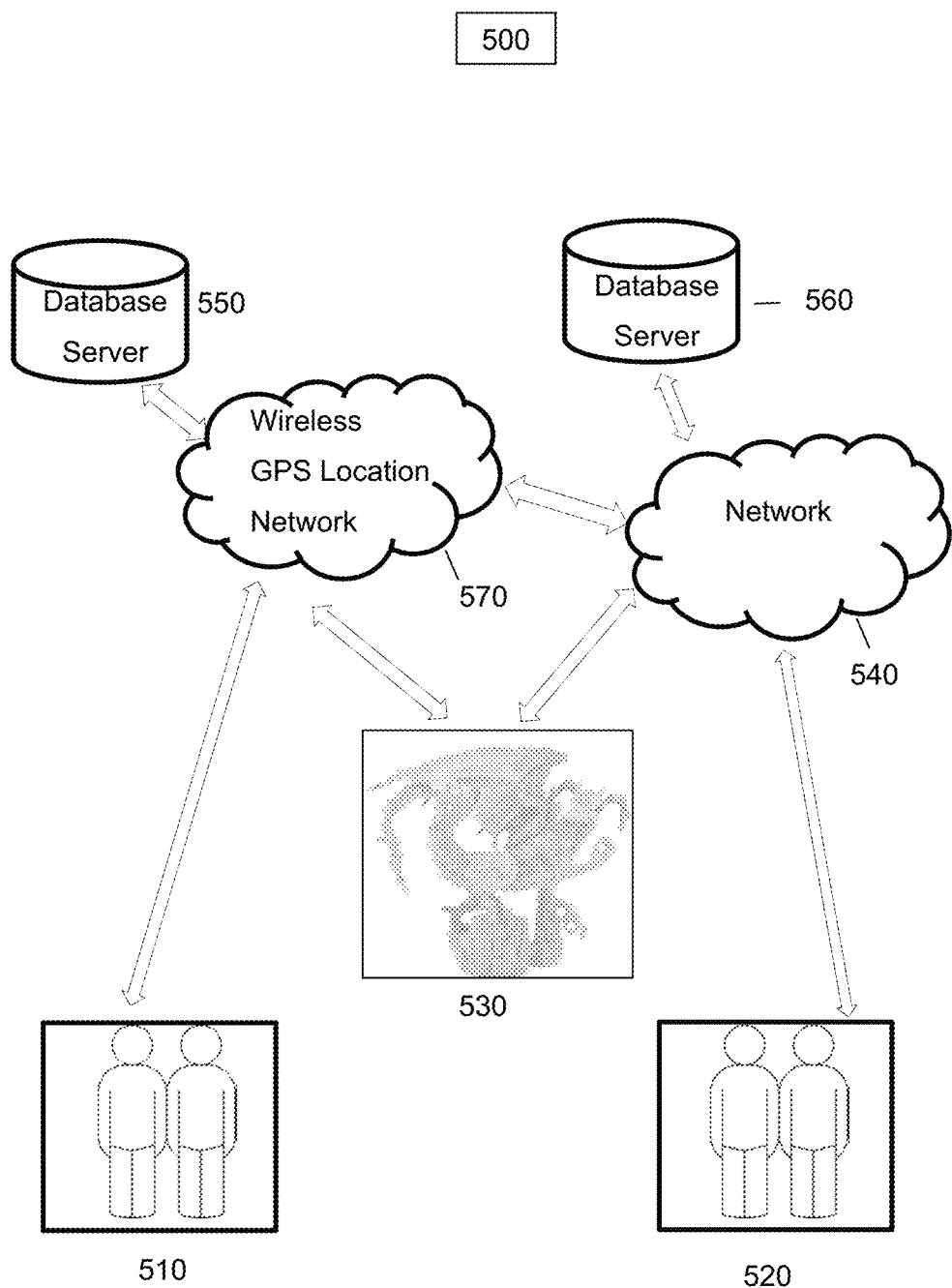
FIG. 5 illustrates a schematic of the game virtual world state along with the state where a user conducting a business transaction in the game is then linked with a user in the charity state of the game.

FIG. 5 illustrates an embodiment of the invention to illustrate how the game engine network 270 will interact with the network 260 as subsets of the larger network 540 to utilize a plurality of database servers 560 and 550 to overlay a real or virtual game characters 530 amidst the augmented to mixed reality world of a user 110 or charity user 120. The wireless GPS location network 570 will interact with the network 540 and users 510 as well as charity users 520 to place the game characters for projection in a client 180 device for a plurality of users 110. The game network engine 270 may present an opportunity for the user 110 to defeat the game character 530 in the everyday life of the user 110. Wireless GPS location network 570 may interact with the user 110 and the network 540 and the game engine network 270 to present opportunities for users 110 and charity users 120 to defeat game characters 530 by completing a strategy on the device as well as completing a business transaction on the system 100. By way of example but not limiting by example, a user 110 may see the opportunity to battle a game character 530 in McDonalds. Various point levels may be achieved through the battle with the virtual game character 530 as well as by transacting business between the user 110 and McDonalds. McDonalds may have purchased a game character 530 on the system to draw users 110 into their business. McDonalds would not only be drawing users 110 to their business, but also sponsoring a linked opportunity with a charity user 120 thereby enabling a business transaction to be directly tied to charity work globally in a network 540 and database 550 and 560 structure that may be tracked in a scrapbook for the user 510 and charity user 520. The wireless GPS Location network 570 may allow users to import characters 530 and game play through the game engine network 270 into their real work activities that links the charity in their life to a global audience through their everyday transactions.

Figure 6:
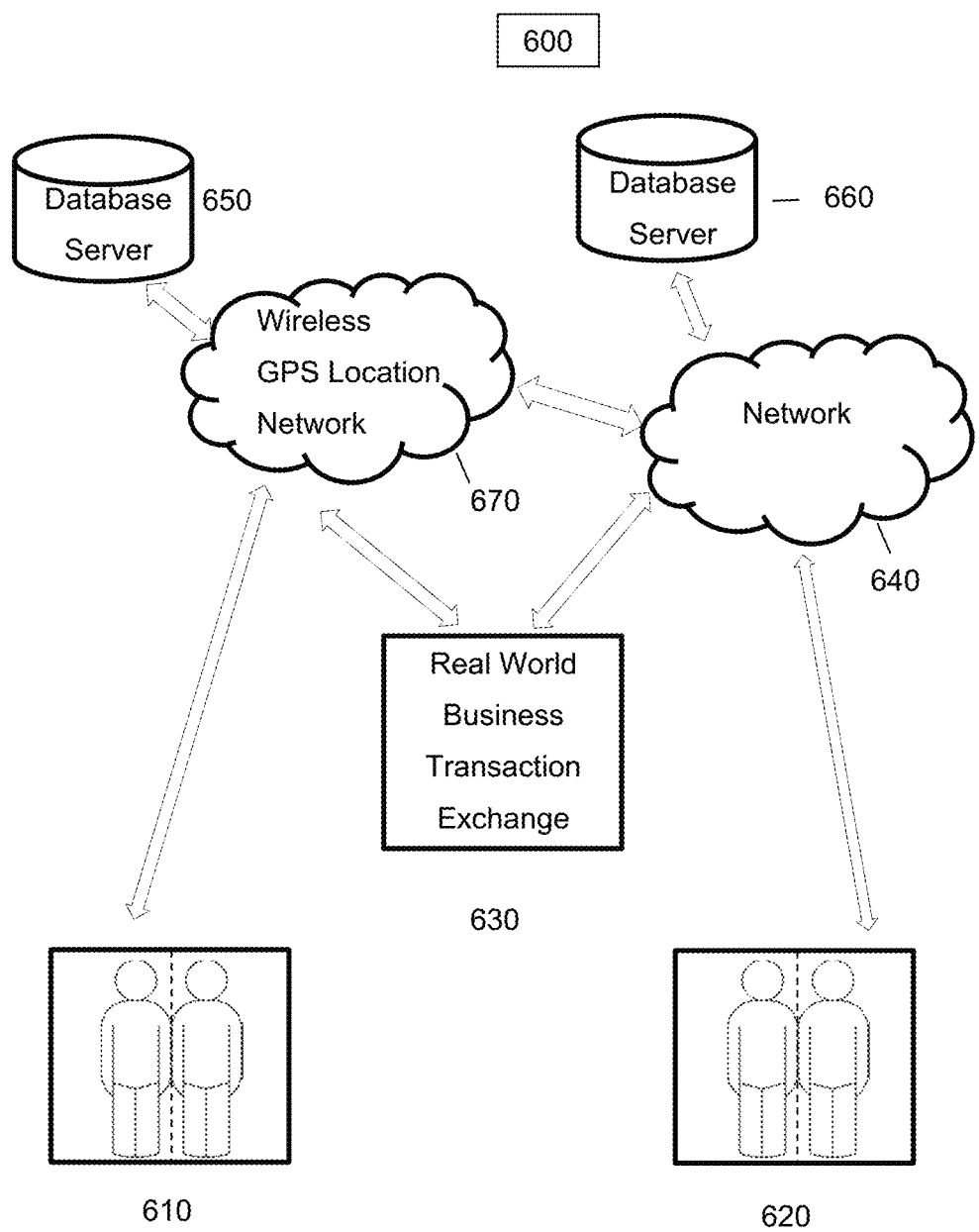
FIG. 6 illustrates a state of the network where a business transaction occurs.

FIG. 6 further elaborates on FIG. 5 by illustrating in an embodiment of the system 600 whereby a business transaction occurs on the real world business transaction exchange 630. By way of example, but not limiting by example, the network of users in the social network database 240 may have the need to move between two locations in a city. Algorithms on the network 640 as well as interaction with the social network database 240 and game engine database 250 as well as wireless GPS location network 670 may allow users to share rides between two locations. The overall system 600 may allow each user 610 to post an offer price for a seat or unit in their car between two said locations. The overall system 600 may also allow other users 610 to post a bid price for a seat or unit in their car between to said locations. Bid prices and offer prices may be posted to a real world business transaction exchange 630 that functions like any other market exchange. The transparent market exchange 630 for a unitized seat of capacity between two points is the unit for which the bid price and offer price apply. The transparent market exchange functions to clear the market for transportation capacity at the lowest effective price the market will bear and with the most efficient outcome for capacity between two points. The method of providing an exchange for unitized capacity between two points breaks the current structure of the automobile down into units smaller than the car as a whole. The method to unitize the transportation market into available seats rather than cars dramatically improves the overall efficiency of the current market and current systems of transportation. The transparent exchange allows for the most efficient price to determine the market price. Prior art and inventions do not properly unitize the automobile in an efficient manner and thus great amounts of waste occur. This invention not only utilizes this most efficient economic outcome by providing the market with a method for an exchange on transportation seat capacity, but also provides a method for the dramatic cost savings of users 110 utilizing the system 100 to allocate a portion of the saved resources towards charity users 120 in the undeveloped world thereby dramatically increasing overall global economic utility in the overall system 600. The claimed dependent method of utilizing a commodity like exchange for various business transactions that have not been unitized properly to gain efficiency is very important towards providing dramatic cost savings for users 610 and benefiting charity users 620.

Figure 7:
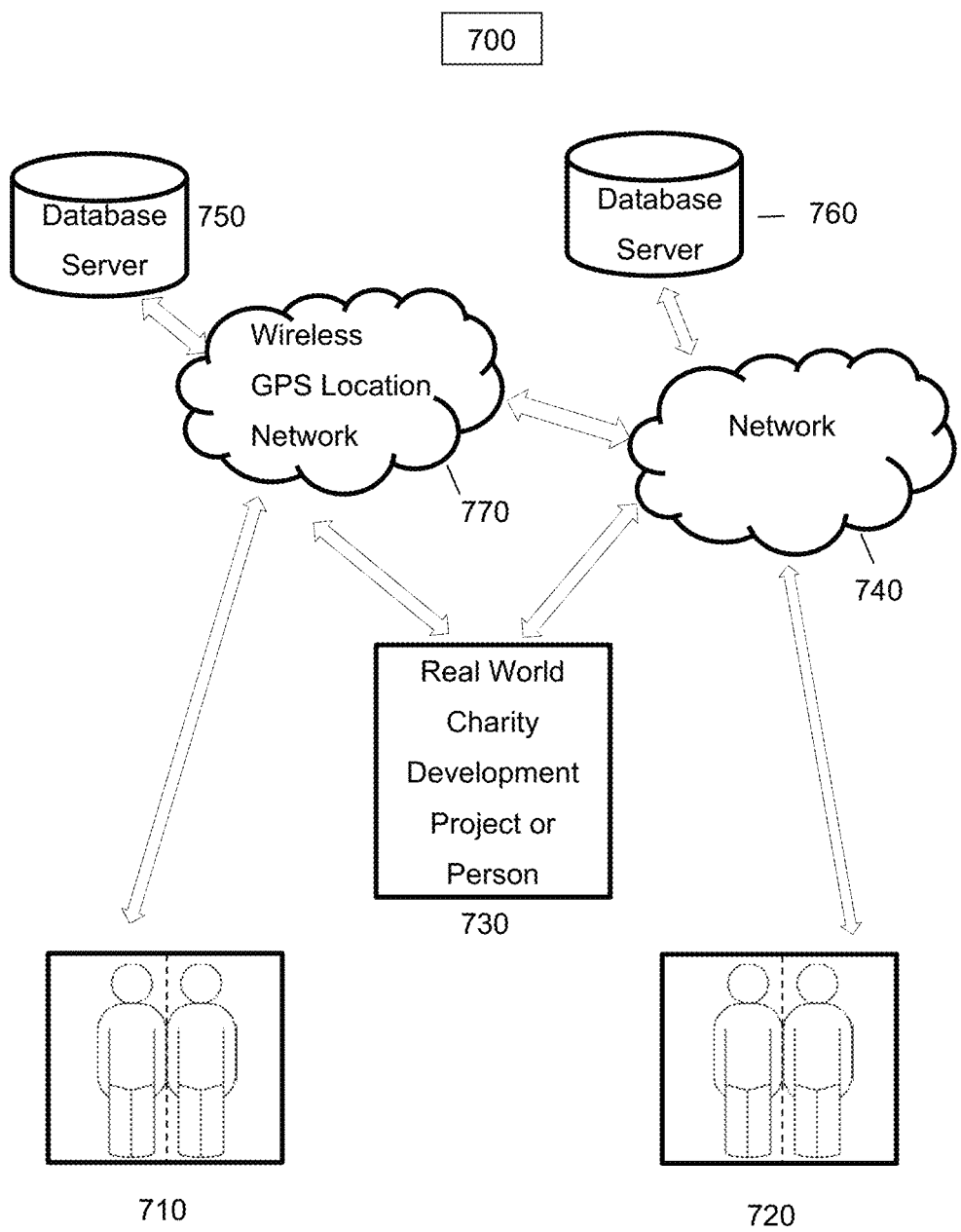
FIG. 7 illustrates a state of the network after a business transaction is consummated where the user of the game is matched with a user in the charity state.

FIG. 7 further elaborates of FIG. 6 and FIG. 5 by illustrating the method and system used to bring together business transactions and markets from everyday users 710 with charity projects 730 and charity users 720. In one implementation or embodiment of various methods the system not only links business transactions and game play between users 710 and charity users 720, but also links the actual charity development project or person 730. As an example, but not limiting by example a charity development project 730 may be a school for orphans in Peshawar, Pakistan. In this embodiment a real world business transaction on the real world business transaction exchange 630 was mixed as part of the game strategy and game character 530 such that when the game character 530 was defeated and the business transaction completed on the exchange 630, a link may be established between the user 710 and the charity user 720. The technology client 180 may provide a real time interaction between the user 710 and charity user 720. The user with charitable need database 230 may record the event and the game engine database 250 and game engine network may log the event for the user 710 and charity user 720 in the social network database 240 scrapbook.

Incentive Reward Matrix

Figure 8:
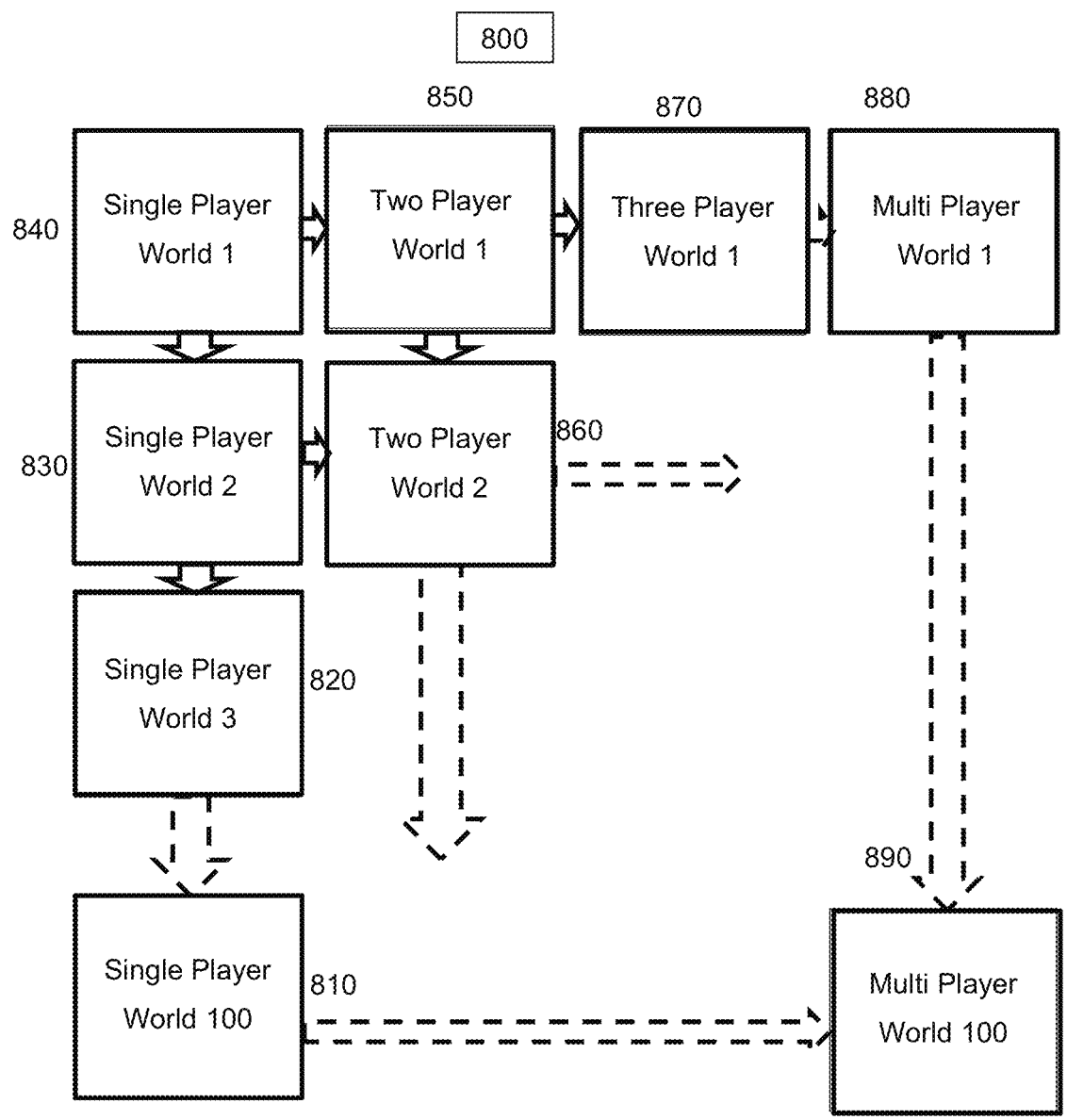
FIG. 8 illustrates a flowchart of various worlds and levels for various player numbers and world levels that are achieved.

FIG. 8 depicts a schematic table of an implementation of a method to provide incentives for users to work together by scoring more points for teamwork business transactions as well as unlocking additional worlds for more complex charity problems. The overall schematic 800 starts in Single Player World 1 840. The embodiment of this stage in the schematic 800 and game structure is the entry point for the reality game, augmented reality game and mixed reality game to commence strategy. By way of example, but not limiting by example, a real world charity development problem or person 730 in Single Player World 1 840 may be providing food or water to a charity user 120 from the transaction of user 110. Once the user completes a task or problem in Single Player World 1, further opportunities exist for advancement to either Single Player World 2 830 or Two player world 1 850, Three player world 1 870, or multi-player world 1 880. Point opportunities are higher for opportunities beyond Single Player World 1 840. Users 110 are able to allocate points and resources to their own charities of choice and a portion of the resources may be used with existing charity development projects or persons 730 from the user with charitable need database 230.

Figure 9:
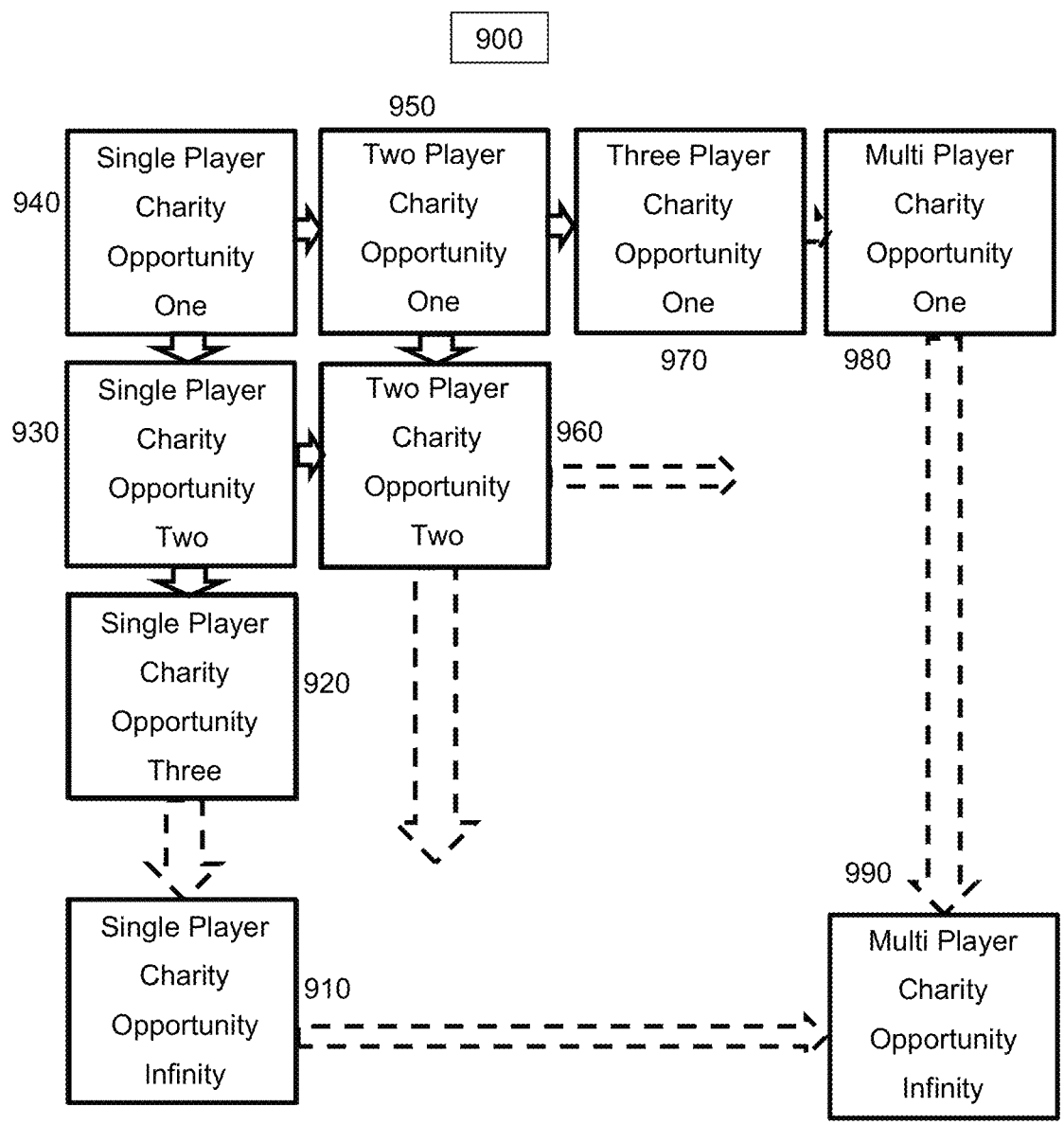
FIG. 9 illustrates a flowchart of various levels of charity development corresponding to various game states and player corroboration involvement.

FIG. 9 depicts a schematic table of an implementation of a method to provide incentives for more difficult charity development projects 730 in the user with charitable need database 230. As an example of the embodiment, but not limiting by example, of the dependent method a single player charity opportunity one 940 may be providing food or water to a charity user 120 by the business transaction of user 110. As another example, but not to limit by example, a multi-player charity opportunity 980 may be providing an entire water well to a village in Africa. Higher point levels and world levels as well as higher amounts of teamwork and multiplayer solutions lead to more impactful charity development projects 730.

Various Technologies to Deploy the Overall System and Method Strategies

Figure 10:
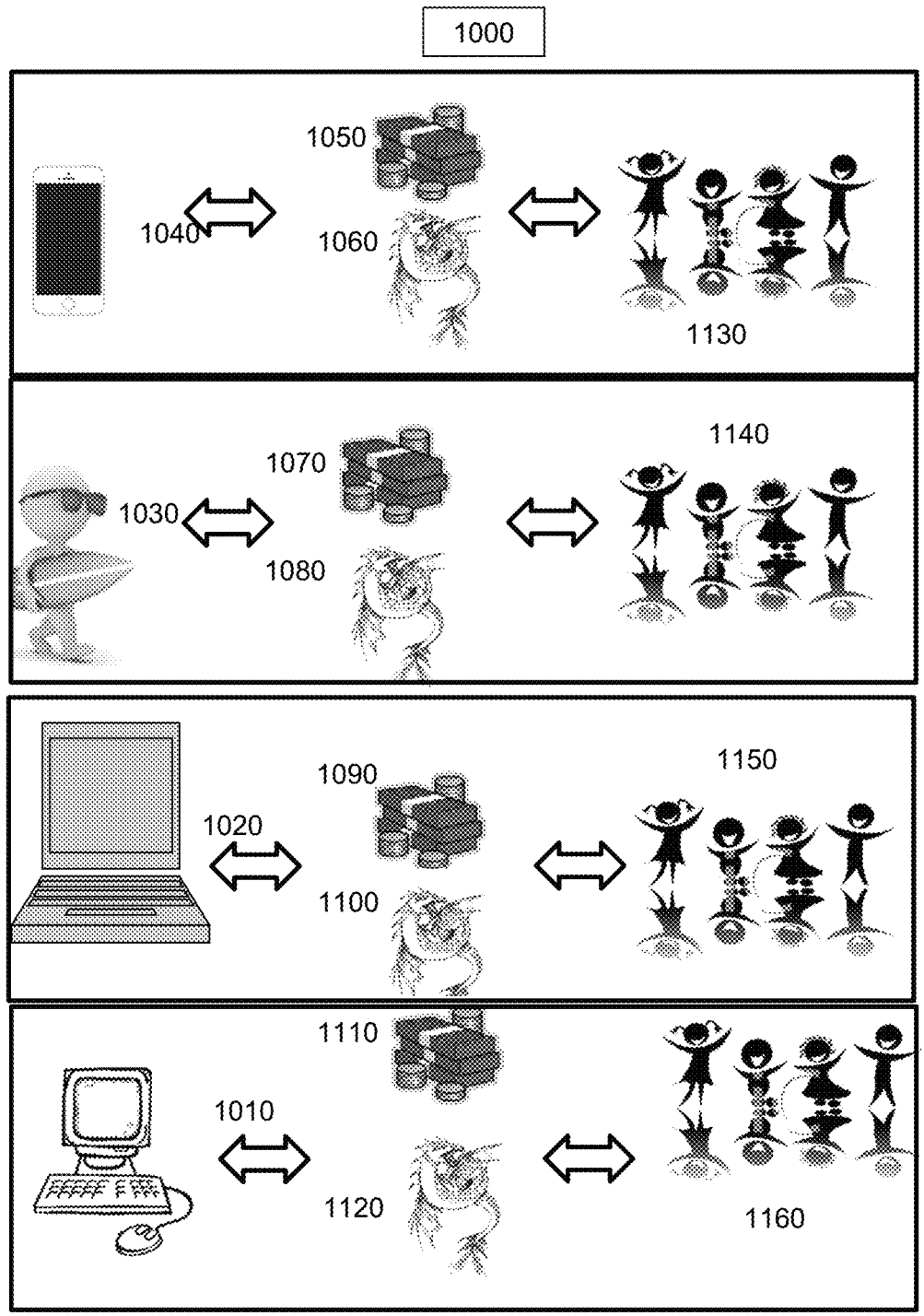
FIG. 10 illustrates various game embodiments or game states in a mobile PC device, headset device, laptop device, PC device or virtual projection device whereby the game network and social network connects users through the game strategy and business transactions then to charity users or clients.

FIG. 10 depicts examples of various methods by which various technology clients 180 are utilized to enhance the user experience for connecting users 110 with charity users 120. Object client 1040 is a mobile computing device with GPS capability which interacts with a plurality of users 110. Business transactions 1050 may be combined with the battling of game characters 1060. Once a user 110 completes a business transaction 1050 on the system 100, the user 110 may unlock a charity opportunity 940 in the charity matrix of opportunities 900. The game further progresses by linking user 110 with charity user 120 which creates opportunity for the undeveloped world 1130 or charity development problem area or people 1130. Client device 1030 is a head mounted computing device that either projects the reality game, reality charity persons, virtual reality game characters, augmented reality characters, or mixed reality characters or charity persons 120 into the world of user 110. Business transactions 1070 may be combined with the battling of game characters 1080. Once a user 110 completes a business transaction 1070 on the system 100, the user 110 may unlock a charity opportunity 940 in the charity matrix of opportunities 900. The game further progresses by linking user 110 with charity user 120 which creates opportunity for the undeveloped world 1140 or charity development problem area or people 1140. Client device 1020 is a lap top computer with GPS capability which interacts with a plurality of users 110 that either projects or displays the reality game, reality charity persons, virtual reality game characters, augmented reality characters, or mixed reality characters or charity persons 120 into the world of user 110. Business transactions 1090 may be combined with the battling of game characters 1100. Once a user 110 completes a business transaction 1090 on the system 100, the user 110 may unlock a charity opportunity 940 in the charity matrix of opportunities 900. The game further progresses by linking user 110 with charity user 120 which creates opportunity for the undeveloped world 1150 or charity development problem area or people 1150. Client device 1010 is a desk top computer with GPS capability which interacts with a plurality of users 110 that either projects or displays the reality game, reality charity persons, virtual reality game characters, augmented reality characters, or mixed reality characters or charity persons 120 into the world of user 110. Business transactions 1110 may be combined with the battling of game characters 1120. Once a user 110 completes a business transaction 1110 on the system 100, the user 110 may unlock a charity opportunity 940 in the charity matrix of opportunities 900. The game further progresses by linking user 110 with charity user 120 which creates opportunity for the undeveloped world 1160 or charity development problem area or people 1160.

Additional Detail on how the Methods and System Interrelate to the Overall Game Strategy and Business Transactions and Charity Users and Development Projects.

Figure 11:
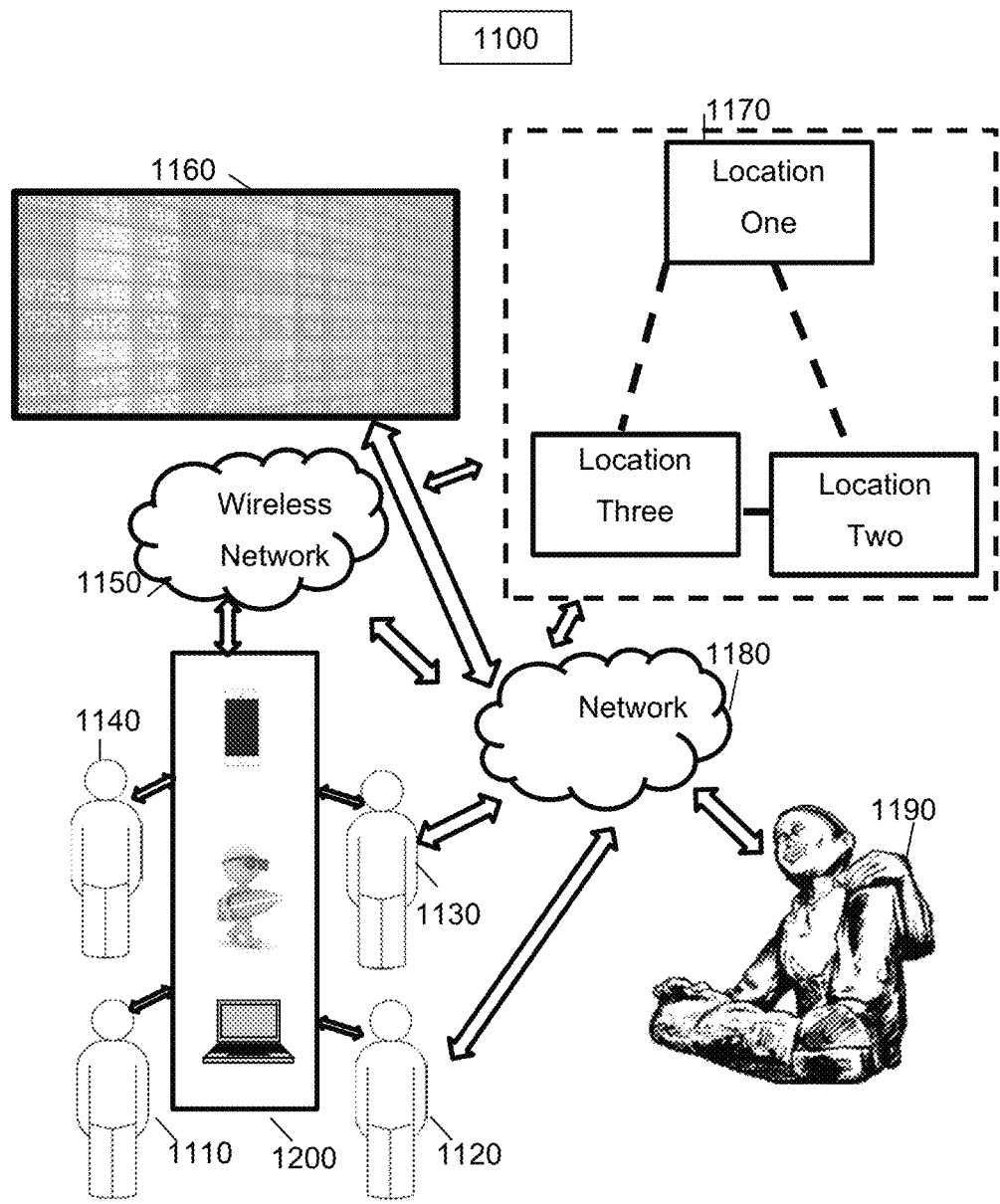
FIG. 11 illustrates a schematic diagram of implementations of methods considering the game application and marketplace, and standard level of service with respect to the business of transportation and ride sharing.

FIG. 11 is a network schematic of many elements of the system 1100 and various embodiments of the methods to fully integrate the most efficient business transaction in the context of a transportation module to make an outcome for the plurality of users 1110, 1140, 1130, 1120 on the network 1180 and their location data from the wireless network 1150 and client devices 1200. The plurality of users 1110, 1140, 1130, 1120 may use client devices 1200 to access the network 1180 and wireless network 1150 to make business transactions on the business transaction exchange 1160. The network 1180 will interact with the game network engine 270 to form a plurality of business transaction opportunities for users 1110. In one embodiment of the claimed methods the network 1180 may interact with the game engine database 250 and game engine network 270 as well as social network database 240 to allows users 1110 to post business transaction bids for a single unit seat in a vehicle to ride from location one to location three in the transportation module 1170. In another implementation, a user 1110 may post an offer for a single seat unit or multiple seat units in a vehicle to ride from location one to location three in the transportation module 1170. Users 1110 may have game incentives to join up with others users 1130 to ride between location one and location three in the transportation module 1170. The various plurality of actions users 1110 make allow for various game worlds to unlock and higher game levels to be obtained and more points to be awarded. Users may then be able to unlock the relationship with a charity user 1190 that will enable the user 1110 to make contact with the charity user 1190 and also the business transaction consummated by user 1110 to ride share with user 1130 on business transaction exchange 1160 in the system 1100 using the client devices 1200 will provide an economic benefit to charity user 1190 or the associated charity need database project record 230. The network 1180 may also provide a record from the charity user need database 230 to log a record in a scrapbook in the game engine database 250 for the user 1110 to see their global impact from simple daily business transactions. The strategy of the game further allows for the charity work to build across a diverse set of worlds that work on basic charity human needs such as a world for solving world hunger, a world for solving the energy crisis, a world for solving health issues, a world for solving the problem of being guilty when you are innocent, a world for solving the refugee crisis, a world for reducing global emissions, a world for solving food waste, a world for solving education, a world for solving the foster child and orphan crisis, a world for solving the homeless crisis, a world for helping the foreigner or immigrant crisis, a world for ending sex trafficking, a world for increasing agricultural productivity, a world for solving gender inequality, a world for helping animals, a world for helping the environment and a world for community development.

Figure 12:
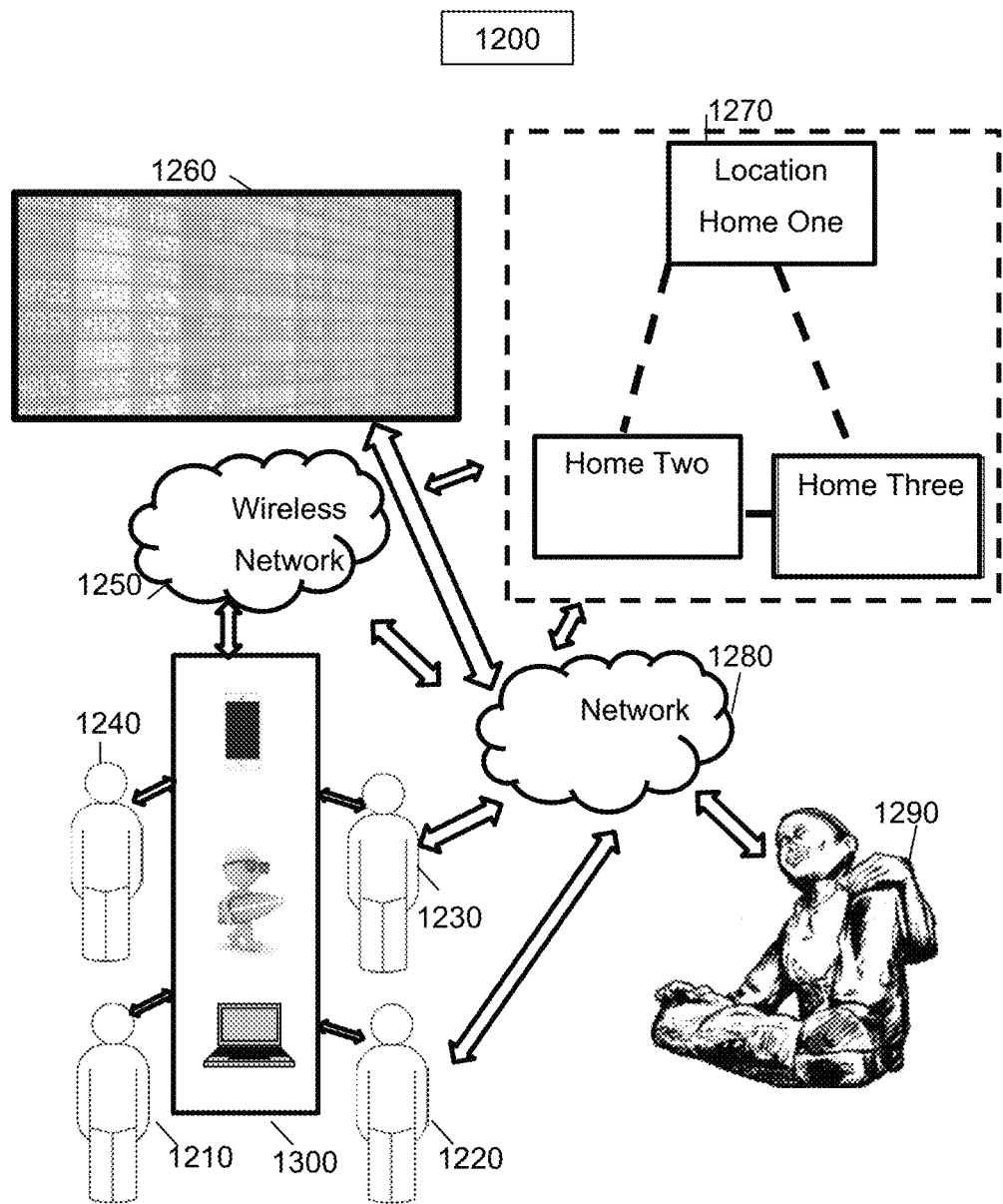
FIG. 12 illustrates a schematic diagram of implementations of methods considering the game application and marketplace, and standard level of service with respect to the business of real estate trading.

FIG. 12 is a network schematic of many elements of the system 1200 and various embodiments of the methods to fully integrate the most efficient business transaction in the context of a housing module to make an outcome for the plurality of users 1210, 1240, 1230, 1220 on the network 1280 and their location data from the wireless network 1150 and client devices 1200. The plurality of users 1210, 1240, 1230, 1220 may use client devices 1300 to access the network 1280 and wireless network 1250 to make business transactions on the business transaction exchange 1260. The network 1280 will interact with the game network engine 270 to form a plurality of business transaction opportunities for users 1210. In one embodiment of the claimed methods the network 1180 may interact with the game engine database 250 and game engine network 270 as well as social network database 240 to allows users 1210 to post business transaction bids for the purchase of a home or apartment or even a single unit room in a dwelling structure in the housing module 1270. In another implementation, a user 1210 may post an offer for a single room unit or multiple room units in a structure to share or utilize lodging space in the housing module 1270. Users 1210 may have game incentives to join up with other users 1230 to share lodging within the housing module 1270. The various plurality of actions users 1210 make allow for various game worlds to unlock and higher game levels to be obtained and more points to be awarded. Users may then be able to unlock the relationship with a charity user 1290 that will enable the user 1210 to make contact with the charity user 1290 and also the business transaction consummated by user 1210 to use the housing module with user 1230 on the business transaction exchange 1260 in the system 1200 using the client devices 1300 may provide an economic benefit to charity user 1290 or the associated charity need database project record 230. The network 1280 may also provide a record from the charity user need database 230 to log a record in a scrapbook in the game engine database 250 for the user 1210 to see their global impact from simple daily business transactions. The strategy of the game further allows for the charity work to build across a diverse set of worlds that work on basic charity human needs such as a world for solving world hunger, a world for solving the energy crisis, a world for solving health issues, a world for solving the problem of being guilty when you are innocent, a world for solving the refugee crisis, a world for reducing global emissions, a world for solving food waste, a world for solving education, a world for solving the foster child and orphan crisis, a world for solving the homeless crisis, a world for helping the foreigner or immigrant crisis, a world for ending sex trafficking, a world for increasing agricultural productivity, a world for solving gender inequality, a world for helping animals, a world for helping the environment and a world for community development.

Figure 13:
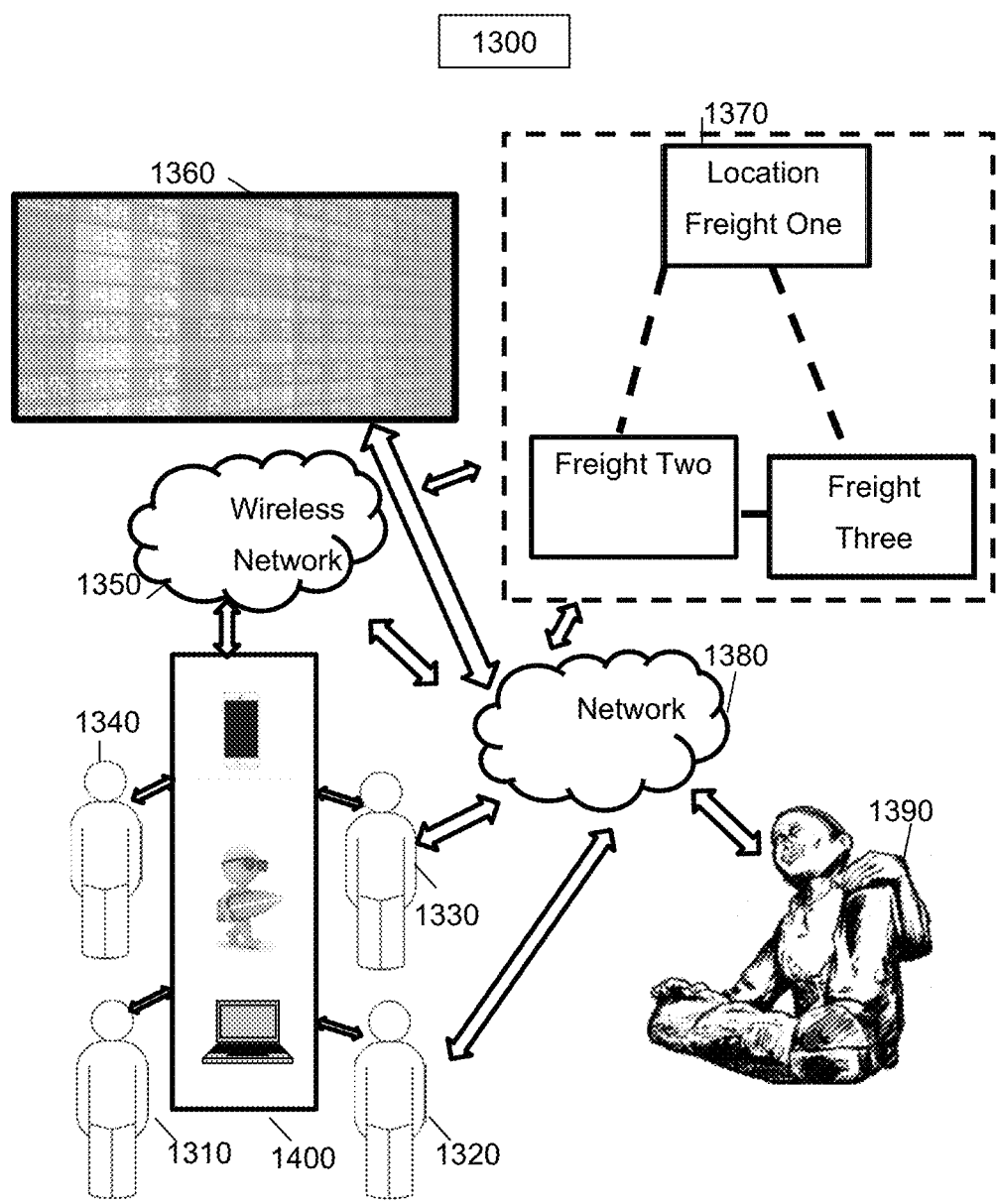
FIG. 13 illustrates a schematic diagram of implementations of methods considering the game application and marketplace, and standard level of service with respect to the business of freight delivery.

FIG. 13 is a network schematic of many elements of the system 1300 and various embodiments of the methods to fully integrate the most efficient business transaction in the context of a freight module to make an outcome for the plurality of users 1310, 1340, 1330, 1320 on the network 1380 and their location data from the wireless network 1350 and client devices 1400. The plurality of users 1310, 1340, 1330, 1320 may use client devices 1400 to access the network 1380 and wireless network 1350 to make business transactions on the business transaction exchange 1360. The network 1380 may interact with the game network engine 270 to form a plurality of business transaction opportunities for users 1310. In one embodiment of the claimed methods the network 1380 may interact with the game engine database 250 and game engine network 270 as well as social network database 240 to allow users 1310 to post business transaction bids for the movement of freight in the freight module 1370. In another implementation, a user 1310 may post an offer for a single freight unit or multiple freight units to move from location one to location three in the freight module 1370. Users 1310 may have game incentives to join up with other users 1330 to share freight routes within the freight module 1370. The various plurality of actions users 1310 make allow for various game worlds to unlock and higher game levels to be obtained and more points to be awarded. Users may then be able to unlock the relationship with a charity user 1390 that will enable the user 1310 to make contact with the charity user 1390 and also the business transaction consummated by user 1310 to use the freight module with user 1330 on the business transaction exchange 1360 in the system 1300 using the client devices 1400 may provide an economic benefit to charity user 1390 or the associated charity need database project record 230. The network 1380 may also provide a record from the charity user need database 230 to log a record in a scrapbook in the game engine database 250 for the user 1310 to see their global impact from simple daily business transactions. The strategy of the game further allows for the charity work to build across a diverse set of worlds that work on basic charity human needs such as a world for solving world hunger, a world for solving the energy crisis, a world for solving health issues, a world for solving the problem of being guilty when you are innocent, a world for solving the refugee crisis, a world for reducing global emissions, a world for solving food waste, a world for solving education, a world for solving the foster child and orphan crisis, a world for solving the homeless crisis, a world for helping the foreigner or immigrant crisis, a world for ending sex trafficking, a world for increasing agricultural productivity, a world for solving gender inequality, a world for helping animals, a world for helping the environment and a world for community development.

Figure 14:
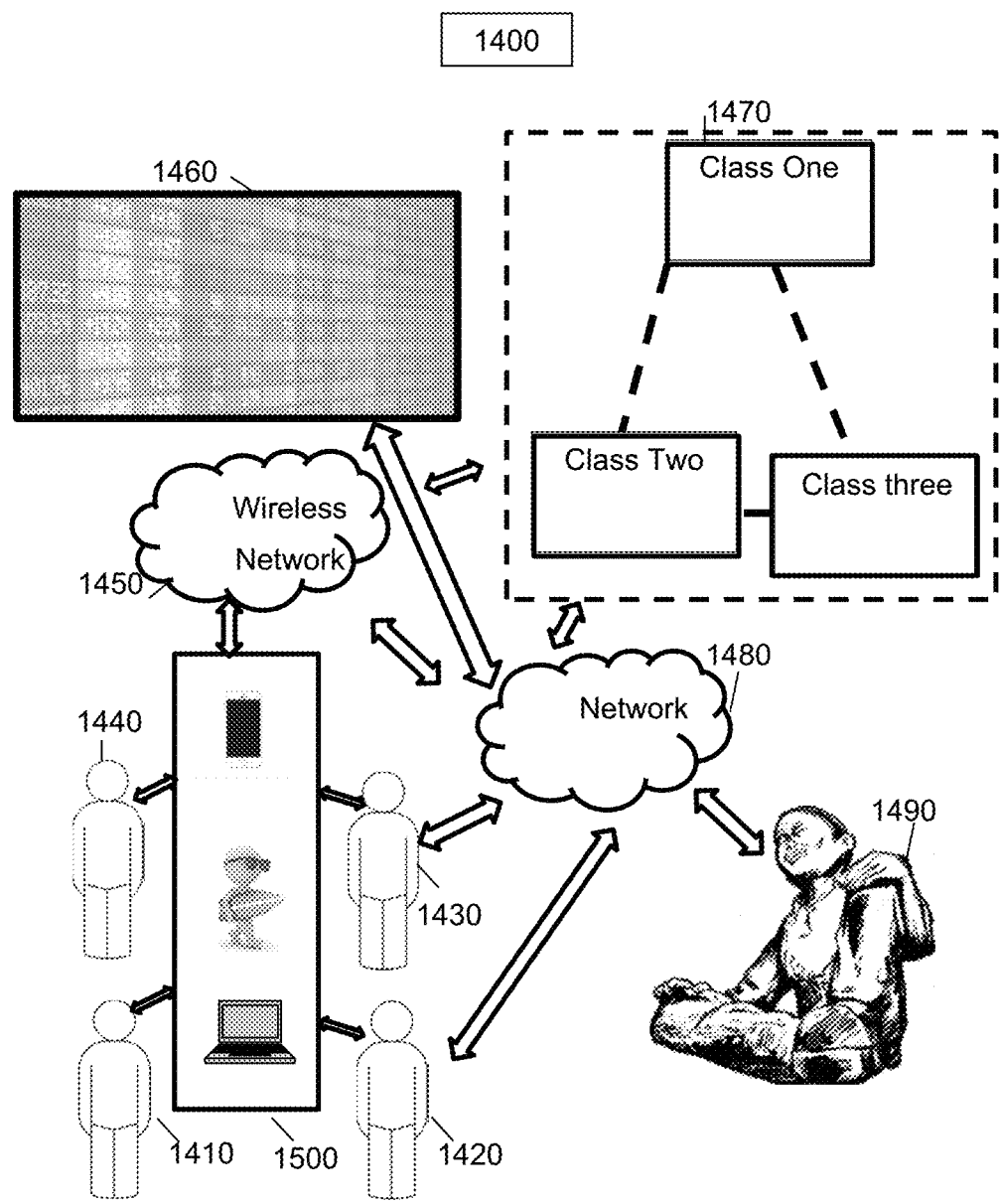
FIG. 14 illustrates a schematic diagram of implementations of methods considering the game application and marketplace, and standard level of service with respect to the business of education.

FIG. 14 is a network schematic of many elements of the system 1400 and various embodiments of the methods to fully integrate the most efficient business transaction in the context of an education class module to make an outcome for the plurality of users 1410, 1440, 1430, 1420 on the network 1480 and their location data from the wireless network 1450 and client devices 1500. The plurality of users 1410, 1440, 1430, 1420 may use client devices 1500 to access the network 1480 and wireless network 1450 to make business transactions on the business transaction exchange 1460. The network 1480 may interact with the game network engine 270 to form a plurality of business transaction opportunities for users 1410. In one embodiment of the claimed methods the network 1480 may interact with the game engine database 250 and game engine network 270 as well as social network database 240 to allow users 1410 to post business transaction bids for an education class in the education module 1470. In another implementation, a user 1410 may post an offer for a single education unit or multiple education units to complete an education in the education module 1470. Users 1410 may have game incentives to join up with other users 1430 to share education needs within the education module 1470. The various plurality of actions users 1410 make allow for various game worlds to unlock and higher game levels to be obtained and more points to be awarded. Users may then be able to unlock the relationship with a charity user 1490 that will enable the user 1410 to make contact with the charity user 1490 and also the business transaction consummated by user 1410 to use the education module with user 1430 on the business transaction exchange 1460 in the system 1400 using the client devices 1500 may provide an economic benefit to charity user 1490 or the associated charity need database project record 230. The network 1480 may also provide a record from the charity user need database 230 to log a record in a scrapbook in the game engine database 250 for the user 1410 to see their global impact from simple daily business transactions. The strategy of the game further allows for the charity work to build across a diverse set of worlds that work on basic charity human needs such as a world for solving world hunger, a world for solving the energy crisis, a world for solving health issues, a world for solving the problem of being guilty when you are innocent, a world for solving the refugee crisis, a world for reducing global emissions, a world for solving food waste, a world for solving education, a world for solving the foster child and orphan crisis, a world for solving the homeless crisis, a world for helping the foreigner or immigrant crisis, a world for ending sex trafficking, a world for increasing agricultural productivity, a world for solving gender inequality, a world for helping animals, a world for helping the environment and a world for community development.

Figure 15:
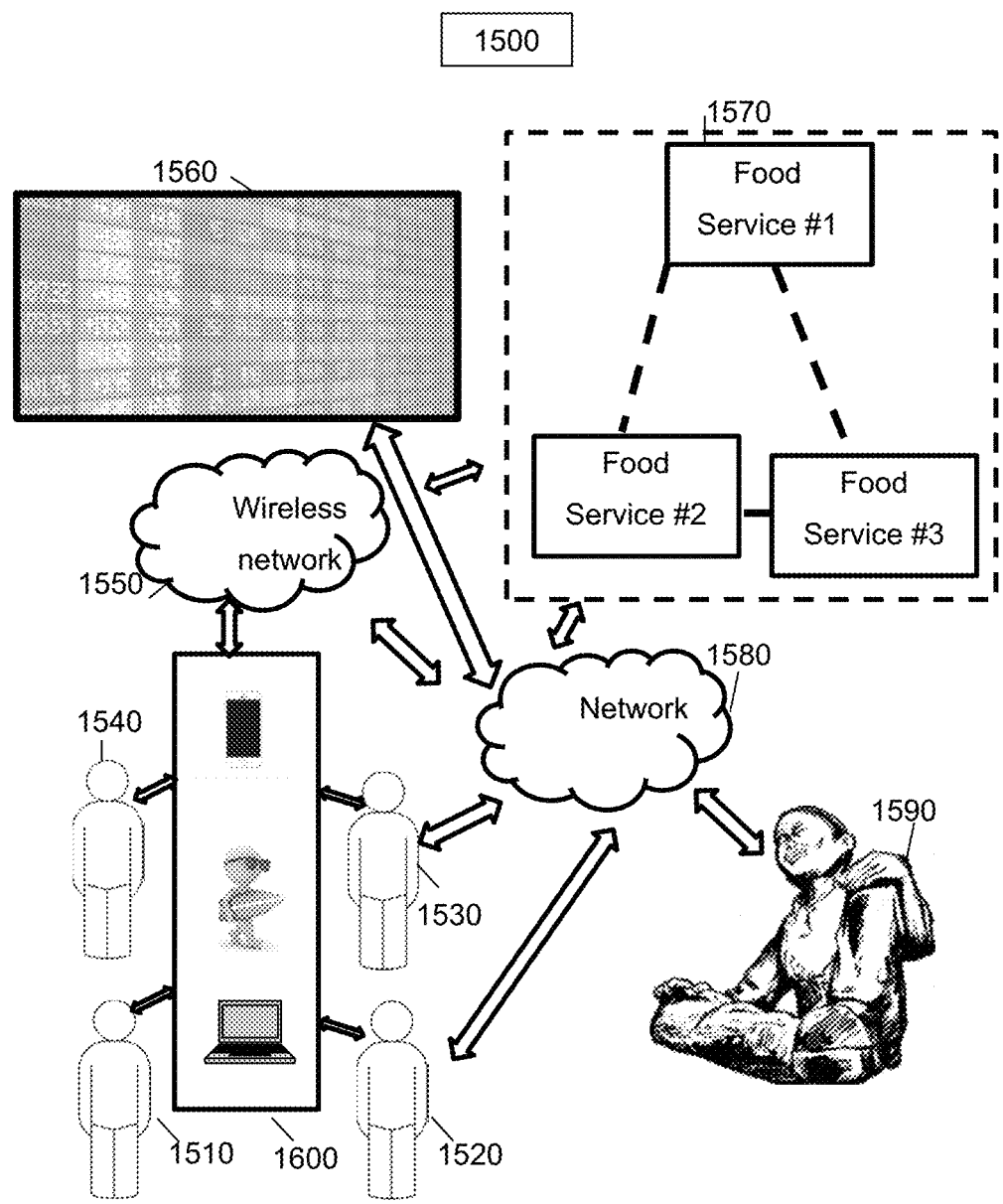
FIG. 15 illustrates a schematic diagram of implementations of methods considering the game application and marketplace, and standard level of service with respect to the business of food and food service.

FIG. 15 is a network schematic of many elements of the system 1500 and various embodiments of the methods to fully integrate the most efficient business transaction in the context of an food and food service module to make an outcome for the plurality of users 1510, 1540, 1530, 1520 on the network 1580 and their location data from the wireless network 1550 and client devices 1600. The plurality of users 1510, 1540, 1530, 1520 may use client devices 1600 to access the network 1580 and wireless network 1550 to make business transactions on the business transaction exchange 1560. The network 1580 may interact with the game network engine 270 to form a plurality of business transaction opportunities for users 1510. In one embodiment of the claimed methods the network 1580 may interact with the game engine database 250 and game engine network 270 as well as social network database 240 to allow users 1510 to post business transaction bids for an food and food service in the food module 1570. In another implementation, a user 1510 may post an offer for a single food or food service unit or multiple food or food service units to offer or buy food or food service in the food module 1570. Users 1510 may have game incentives to join up with other users 1530 to share food or food service needs within the food module 1570. The various plurality of actions users 1510 make allow for various game worlds to unlock and higher game levels to be obtained and more points to be awarded. Users may then be able to unlock the relationship with a charity user 1590 that will enable the user 1510 to make contact with the charity user 1590 and also the business transaction consummated by user 1510 to use the food module with user 1530 on the business transaction exchange 1560 in the system 1500 using the client devices 1600 may provide an economic benefit to charity user 1590 or the associated charity need database project record 230. The network 1580 may also provide a record from the charity user need database 230 to log a record in a scrapbook in the game engine database 250 for the user 1510 to see their global impact from simple daily business transactions. The strategy of the game further allows for the charity work to build across a diverse set of worlds that work on basic charity human needs such as a world for solving world hunger, a world for solving the energy crisis, a world for solving health issues, a world for solving the problem of being guilty when you are innocent, a world for solving the refugee crisis, a world for reducing global emissions, a world for solving food waste, a world for solving education, a world for solving the foster child and orphan crisis, a world for solving the homeless crisis, a world for helping the foreigner or immigrant crisis, a world for ending sex trafficking, a world for increasing agricultural productivity, a world for solving gender inequality, a world for helping animals, a world for helping the environment and a world for community development.

Figure 16:
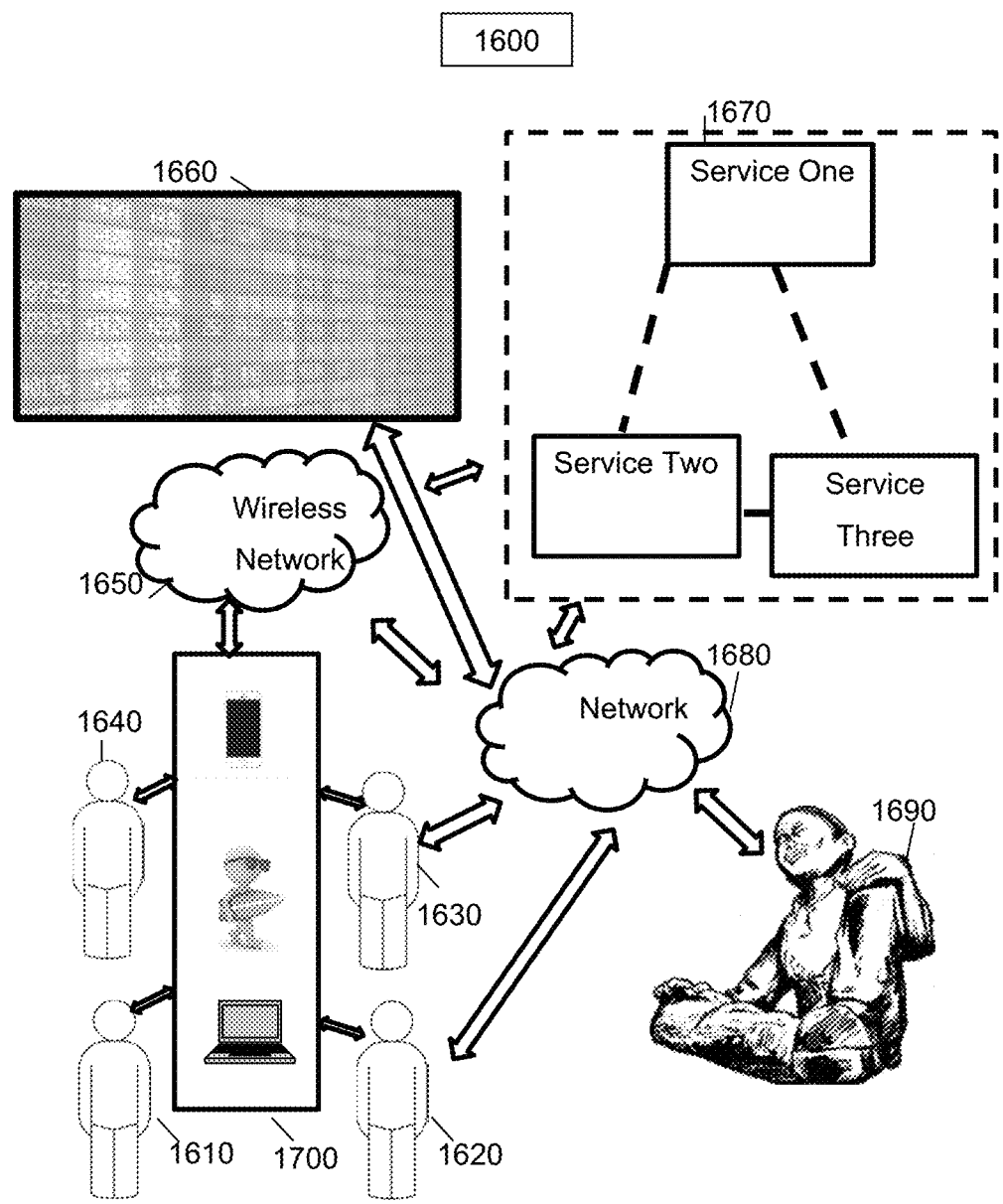
FIG. 16 illustrates a schematic diagram of implementations of methods considering the game application and marketplace, and standard level of service with respect to the business of services.

FIG. 16 is a network schematic of many elements of the system 1600 and various embodiments of the methods to fully integrate the most efficient business transaction in the context of an service module to make an outcome for the plurality of users 1610, 1640, 1630, 1620 on the network 1680 and their location data from the wireless network 1650 and client devices 1700. The plurality of users 1610, 1640, 1630, 1620 may use client devices 1700 to access the network 1680 and wireless network 1650 to make business transactions on the business transaction exchange 1660. The network 1680 may interact with the game network engine 270 to form a plurality of business transaction opportunities for users 1610. In one embodiment of the claimed methods the network 1680 may interact with the game engine database 250 and game engine network 270 as well as social network database 240 to allow users 1610 to post business transaction bids for service in the service module 1670. In another implementation, a user 1610 may post an offer for a single service unit or multiple service units to offer or buy services in the services module 1670. Users 1610 may have game incentives to join up with other users 1630 to share service needs within the service module 1670. The various plurality of actions users 1610 make allow for various game worlds to unlock and higher game levels to be obtained and more points to be awarded. Users may then be able to unlock the relationship with a charity user 1690 that will enable the user 1610 to make contact with the charity user 1690 and also the business transaction consummated by user 1610 to use the service module with user 1630 on the business transaction exchange 1660 in the system 1600 using the client devices 1700 may provide an economic benefit to charity user 1690 or the associated charity need database project record 230. The network 1680 may also provide a record from the charity user need database 230 to log a record in a scrapbook in the game engine database 250 for the user 1610 to see their global impact from simple daily business transactions. The strategy of the game further allows for the charity work to build across a diverse set of worlds that work on basic charity human needs such as a world for solving world hunger, a world for solving the energy crisis, a world for solving health issues, a world for solving the problem of being guilty when you are innocent, a world for solving the refugee crisis, a world for reducing global emissions, a world for solving food waste, a world for solving education, a world for solving the foster child and orphan crisis, a world for solving the homeless crisis, a world for helping the foreigner or immigrant crisis, a world for ending sex trafficking, a world for increasing agricultural productivity, a world for solving gender inequality, a world for helping animals, a world for helping the environment and a world for community development.

Figure 17:
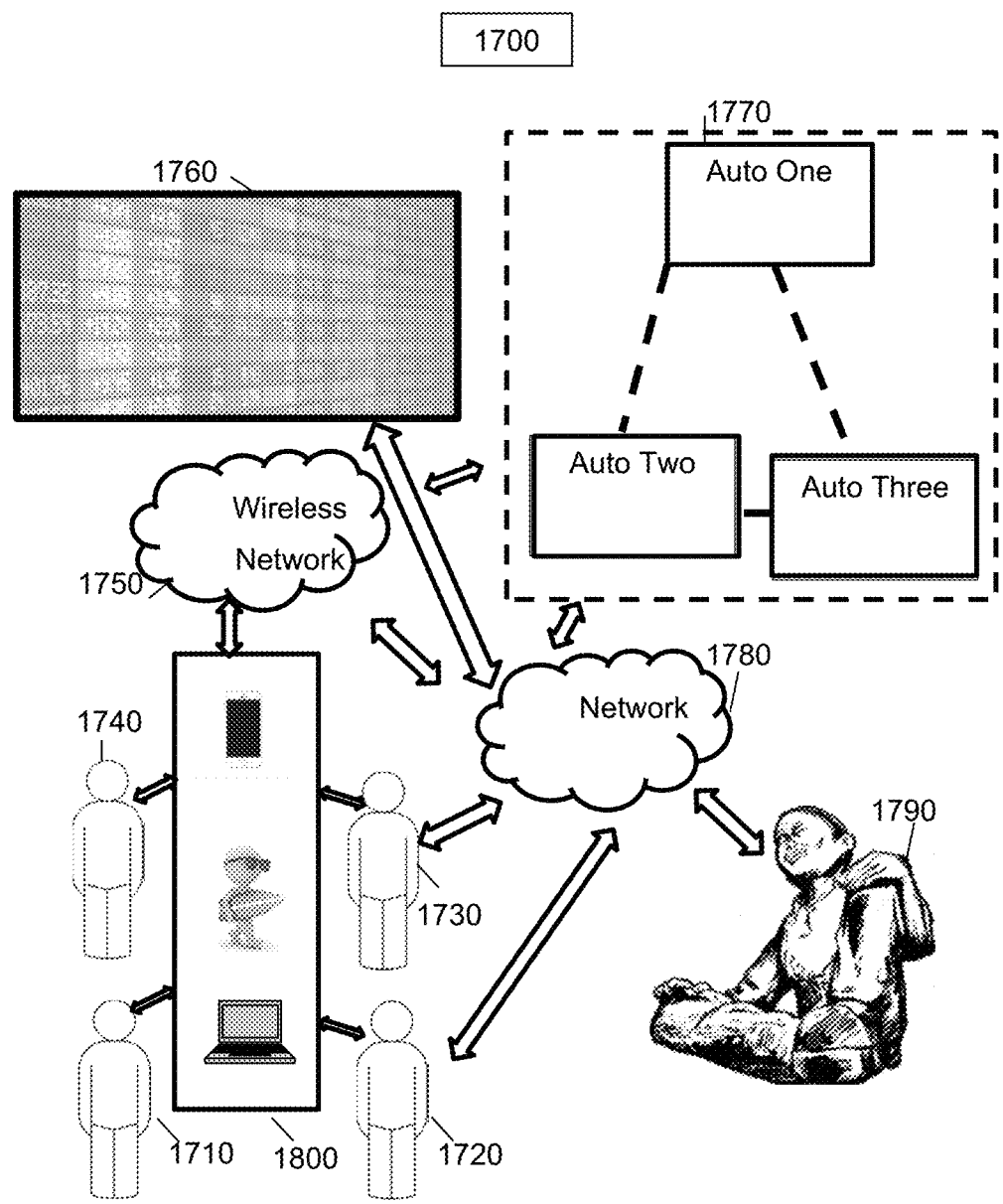
FIG. 17 illustrates a schematic diagram of implementations of methods considering the game application and marketplace, and standard level of service with respect to the business of automobiles.

FIG. 17 is a network schematic of many elements of the system 1700 and various embodiments of the methods to fully integrate the most efficient business transaction in the context of an automobile module to make an outcome for the plurality of users 1710, 1740, 1730, 1720 on the network 1780 and their location data from the wireless network 1750 and client devices 1800. The plurality of users 1710, 1740, 1730, 1720 may use client devices 1800 to access the network 1780 and wireless network 1750 to make business transactions on the business transaction exchange 1760. The network 1780 may interact with the game network engine 270 to form a plurality of business transaction opportunities for users 1710. In one embodiment of the claimed methods the network 1780 may interact with the game engine database 250 and game engine network 270 as well as social network database 240 to allow users 1710 to post business transaction bids for automobiles in the automobile module 1770. In another implementation, a user 1710 may post an offer for a single automobile unit or multiple automobile units to offer or buy automobile unites in the automobile module 1770. Users 1710 may have game incentives to join up with other users 1730 to share automobile needs within the automobile module 1770. The various plurality of actions users 1710 make allow for various game worlds to unlock and higher game levels to be obtained and more points to be awarded. Users may then be able to unlock the relationship with a charity user 1790 that will enable the user 1710 to make contact with the charity user 1790 and also the business transaction consummated by user 1710 to use the automobile module with user 1730 on the business transaction exchange 1760 in the system 1700 using the client devices 1800 may provide an economic benefit to charity user 1790 or the associated charity need database project record 230. The network 1780 may also provide a record from the charity user need database 230 to log a record in a scrapbook in the game engine database 250 for the user 1710 to see their global impact from simple daily business transactions. The strategy of the game further allows for the charity work to build across a diverse set of worlds that work on basic charity human needs such as a world for solving world hunger, a world for solving the energy crisis, a world for solving health issues, a world for solving the problem of being guilty when you are innocent, a world for solving the refugee crisis, a world for reducing global emissions, a world for solving food waste, a world for solving education, a world for solving the foster child and orphan crisis, a world for solving the homeless crisis, a world for helping the foreigner or immigrant crisis, a world for ending sex trafficking, a world for increasing agricultural productivity, a world for solving gender inequality, a world for helping animals, a world for helping the environment and a world for community development.

Figure 18:
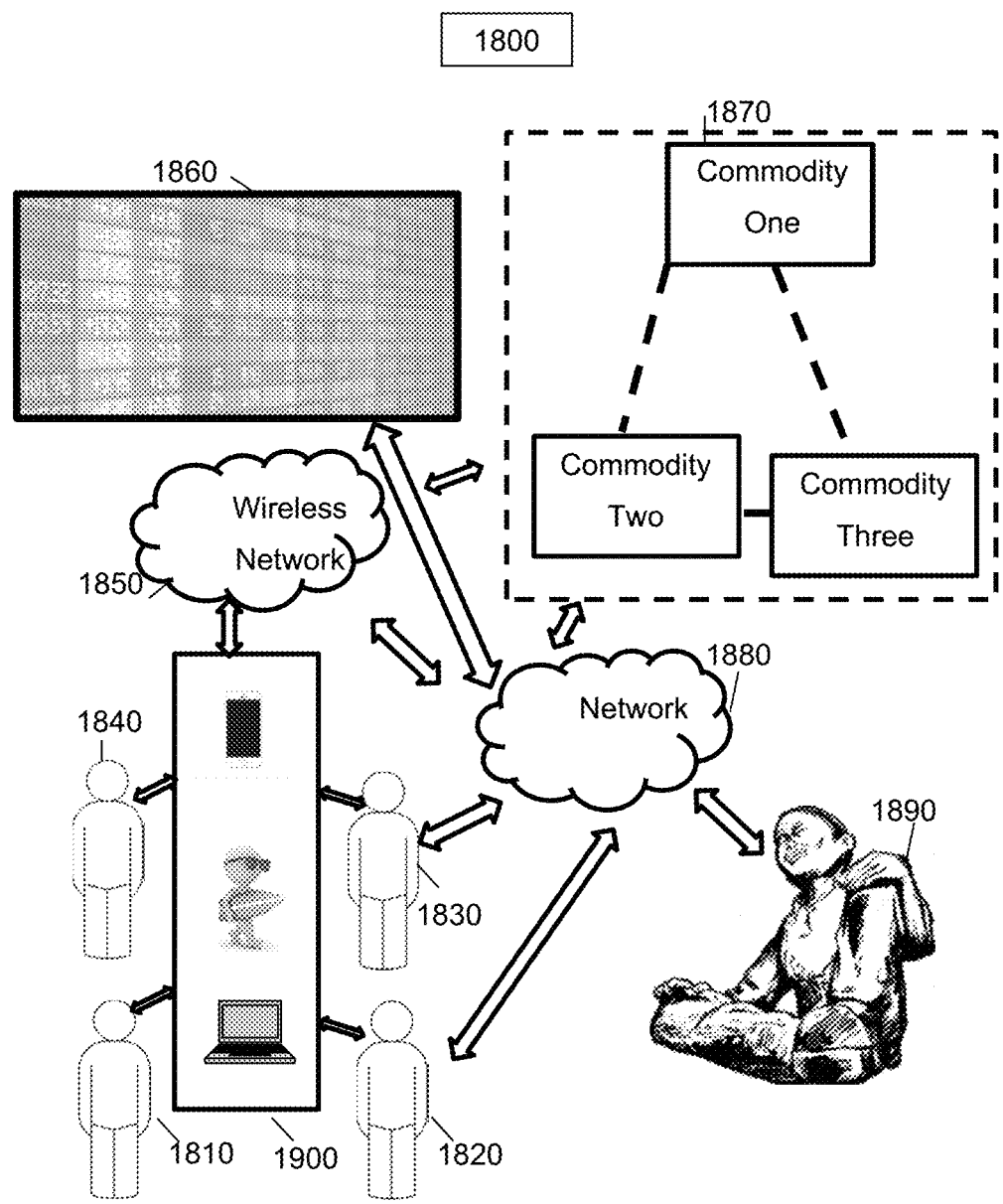
FIG. 18 illustrates a schematic diagram of implementations of methods considering the game application and marketplace, and standard level of service with respect to the business of commodities.

FIG. 18 is a network schematic of many elements of the system 1800 and various embodiments of the methods to fully integrate the most efficient business transaction in the context of an commodity module to make an outcome for the plurality of users 1810, 1840, 1830, 1820 on the network 1880 and their location data from the wireless network 1850 and client devices 1900. The plurality of users 1810, 1840, 1830, 1820 may use client devices 1900 to access the network 1880 and wireless network 1850 to make business transactions on the business transaction exchange 1860. The network 1880 may interact with the game network engine 270 to form a plurality of business transaction opportunities for users 1810. In one embodiment of the claimed methods the network 1880 may interact with the game engine database 250 and game engine network 270 as well as social network database 240 to allow users 1810 to post business transaction bids for commodities in the commodity module 1870. In another implementation, a user 1810 may post an offer for a single commodity unit or multiple commodity units to offer or buy commodity units in the commodity module 1870. Users 1810 may have game incentives to join up with other users 1830 to share commodity needs within the commodity module 1870. The various plurality of actions users 1810 make allow for various game worlds to unlock and higher game levels to be obtained and more points to be awarded. Users may then be able to unlock the relationship with a charity user 1890 that will enable the user 1810 to make contact with the charity user 1890 and also the business transaction consummated by user 1810 to use the commodity module with user 1830 on the business transaction exchange 1860 in the system 1800 using the client devices 1900 may provide an economic benefit to charity user 1890 or the associated charity need database project record 230. The network 1880 may also provide a record from the charity user need database 230 to log a record in a scrapbook in the game engine database 250 for the user 1810 to see their global impact from simple daily business transactions. The strategy of the game further allows for the charity work to build across a diverse set of worlds that work on basic charity human needs such as a world for solving world hunger, a world for solving the energy crisis, a world for solving health issues, a world for solving the problem of being guilty when you are innocent, a world for solving the refugee crisis, a world for reducing global emissions, a world for solving food waste, a world for solving education, a world for solving the foster child and orphan crisis, a world for solving the homeless crisis, a world for helping the foreigner or immigrant crisis, a world for ending sex trafficking, a world for increasing agricultural productivity, a world for solving gender inequality, a world for helping animals, a world for helping the environment and a world for community development.

Figure 19:
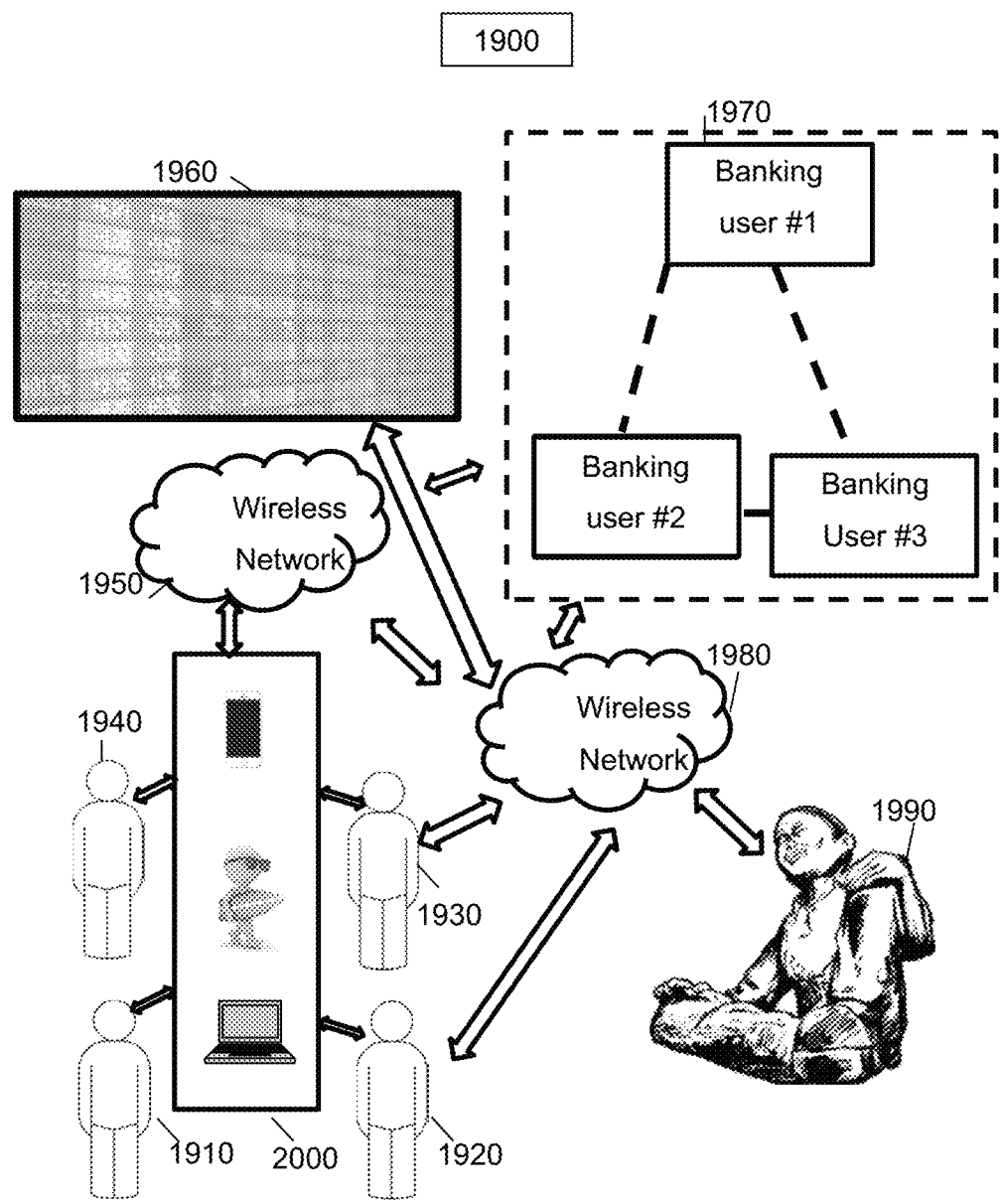
FIG. 19 illustrates a schematic diagram of implementations of methods considering the game application and marketplace, and standard level of service with respect to the business of banking.

FIG. 19 is a network schematic of many elements of the system 1900 and various embodiments of the methods to fully integrate the most efficient business transaction in the context of a banking module to make an outcome for the plurality of users 1910, 1940, 1930, 1920 on the network 1980 and their location data from the wireless network 1950 and client devices 2000. The plurality of users 1910, 1940, 1930, 1920 may use client devices 2000 to access the network 1980 and wireless network 1950 to make business transactions on the business transaction exchange 1960. The network 1980 may interact with the game network engine 270 to form a plurality of business transaction opportunities for users 1910. In one embodiment of the claimed methods the network 1980 may interact with the game engine database 250 and game engine network 270 as well as social network database 240 to allow users 1910 to post business transaction bids for banking or loans in the banking module 1970. In another implementation, a user 1910 may post an offer for a single banking or loan unit or multiple banking or loan units to offer or buy banking or loan units in the banking module 1970. Users 1910 may have game incentives to join up with other users 1930 to share banking needs within the banking module 1970. The various plurality of actions users 1910 make allow for various game worlds to unlock and higher game levels to be obtained and more points to be awarded. Users may then be able to unlock the relationship with a charity user 1990 that will enable the user 1910 to make contact with the charity user 1990 and also the business transaction consummated by user 1910 to use the banking module with user 1930 on the business transaction exchange 1960 in the system 1900 using the client devices 2000 may provide an economic benefit to charity user 1990 or the associated charity need database project record 230. The network 1980 may also provide a record from the charity user need database 230 to log a record in a scrapbook in the game engine database 250 for the user 1910 to see their global impact from simple daily business transactions. The strategy of the game further allows for the charity work to build across a diverse set of worlds that work on basic charity human needs such as a world for solving world hunger, a world for solving the energy crisis, a world for solving health issues, a world for solving the problem of being guilty when you are innocent, a world for solving the refugee crisis, a world for reducing global emissions, a world for solving food waste, a world for solving education, a world for solving the foster child and orphan crisis, a world for solving the homeless crisis, a world for helping the foreigner or immigrant crisis, a world for ending sex trafficking, a world for increasing agricultural productivity, a world for solving gender inequality, a world for helping animals, a world for helping the environment and a world for community development.

Figure 20:
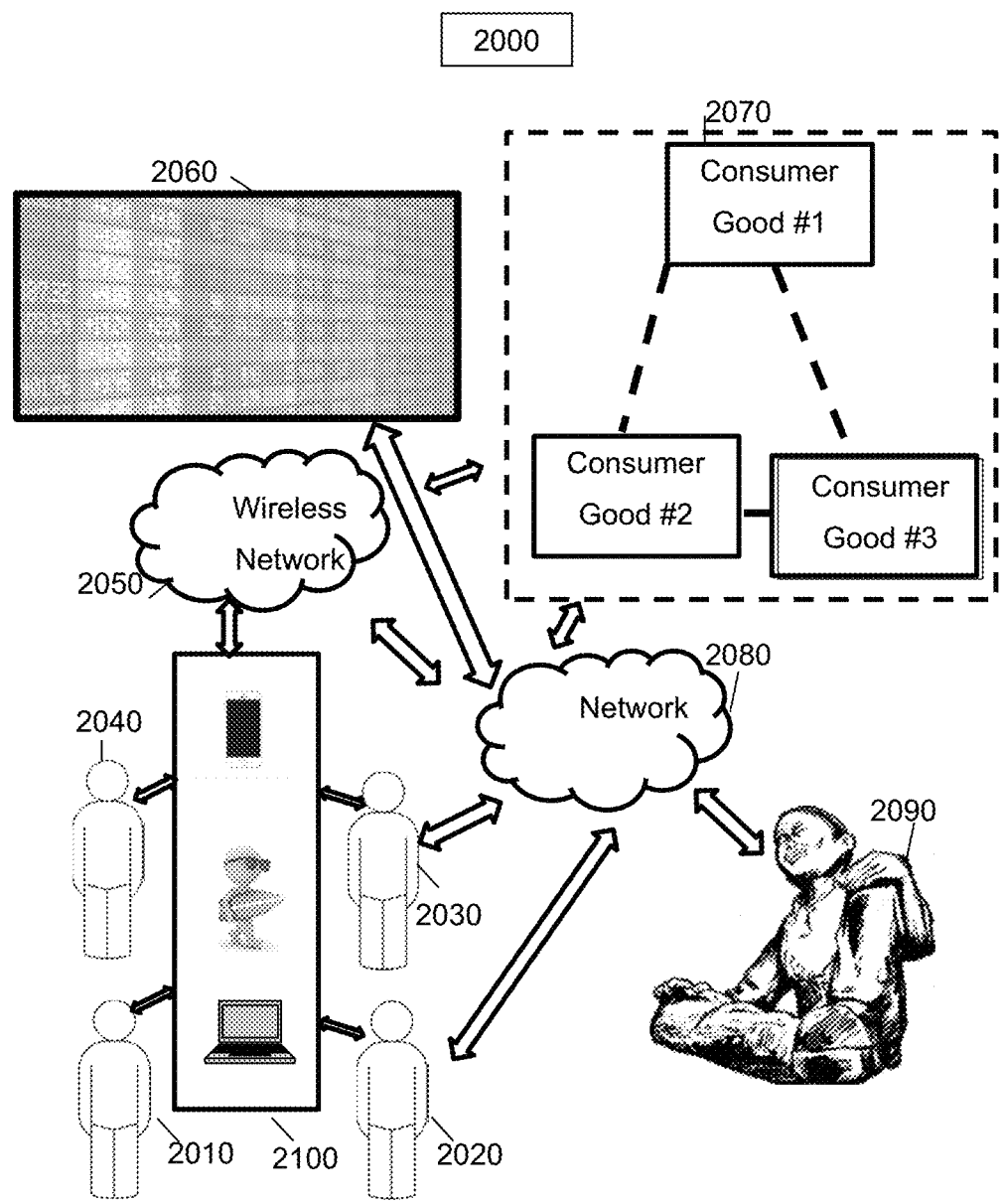
FIG. 20 illustrates a schematic diagram of implementations of methods considering the game application and marketplace, and standard level of service with respect to the business of consumer goods.

FIG. 20 is a network schematic of many elements of the system 2000 and various embodiments of the methods to fully integrate the most efficient business transaction in the context of a consumer goods module to make an outcome for the plurality of users 2010, 2040, 2030, 2020 on the network 2080 and their location data from the wireless network 2050 and client devices 2100. The plurality of users 2010, 2040, 2030, 2020 may use client devices 2100 to access the network 2080 and wireless network 2050 to make business transactions on the business transaction exchange 2060. The network 2080 may interact with the game network engine 270 to form a plurality of business transaction opportunities for users 2010. In one embodiment of the claimed methods the network 2080 may interact with the game engine database 250 and game engine network 270 as well as social network database 240 to allow users 2010 to post business transaction bids for consumer goods in the consumer goods module 2070. In another implementation, a user 2010 may post an offer for a single consumer goods unit or multiple consumer goods units to offer or buy consumer goods units in the consumer goods module 2070. Users 2010 may have game incentives to join up with other users 2030 to share consumer goods needs within the consumer goods module 2070. The various plurality of actions users 2010 make allow for various game worlds to unlock and higher game levels to be obtained and more points to be awarded. Users may then be able to unlock the relationship with a charity user 2090 that will enable the user 2010 to make contact with the charity user 2090 and also the business transaction consummated by user 2010 to use the consumer goods module with user 2030 on the business transaction exchange 2060 in the system 2000 using the client devices 2100 may provide an economic benefit to charity user 2090 or the associated charity need database project record 230. The network 2080 may also provide a record from the charity user need database 230 to log a record in a scrapbook in the game engine database 250 for the user 2010 to see their global impact from simple daily business transactions. The strategy of the game further allows for the charity work to build across a diverse set of worlds that work on basic charity human needs such as a world for solving world hunger, a world for solving the energy crisis, a world for solving health issues, a world for solving the problem of being guilty when you are innocent, a world for solving the refugee crisis, a world for reducing global emissions, a world for solving food waste, a world for solving education, a world for solving the foster child and orphan crisis, a world for solving the homeless crisis, a world for helping the foreigner or immigrant crisis, a world for ending sex trafficking, a world for increasing agricultural productivity, a world for solving gender inequality, a world for helping animals, a world for helping the environment and a world for community development.

Figure 21:
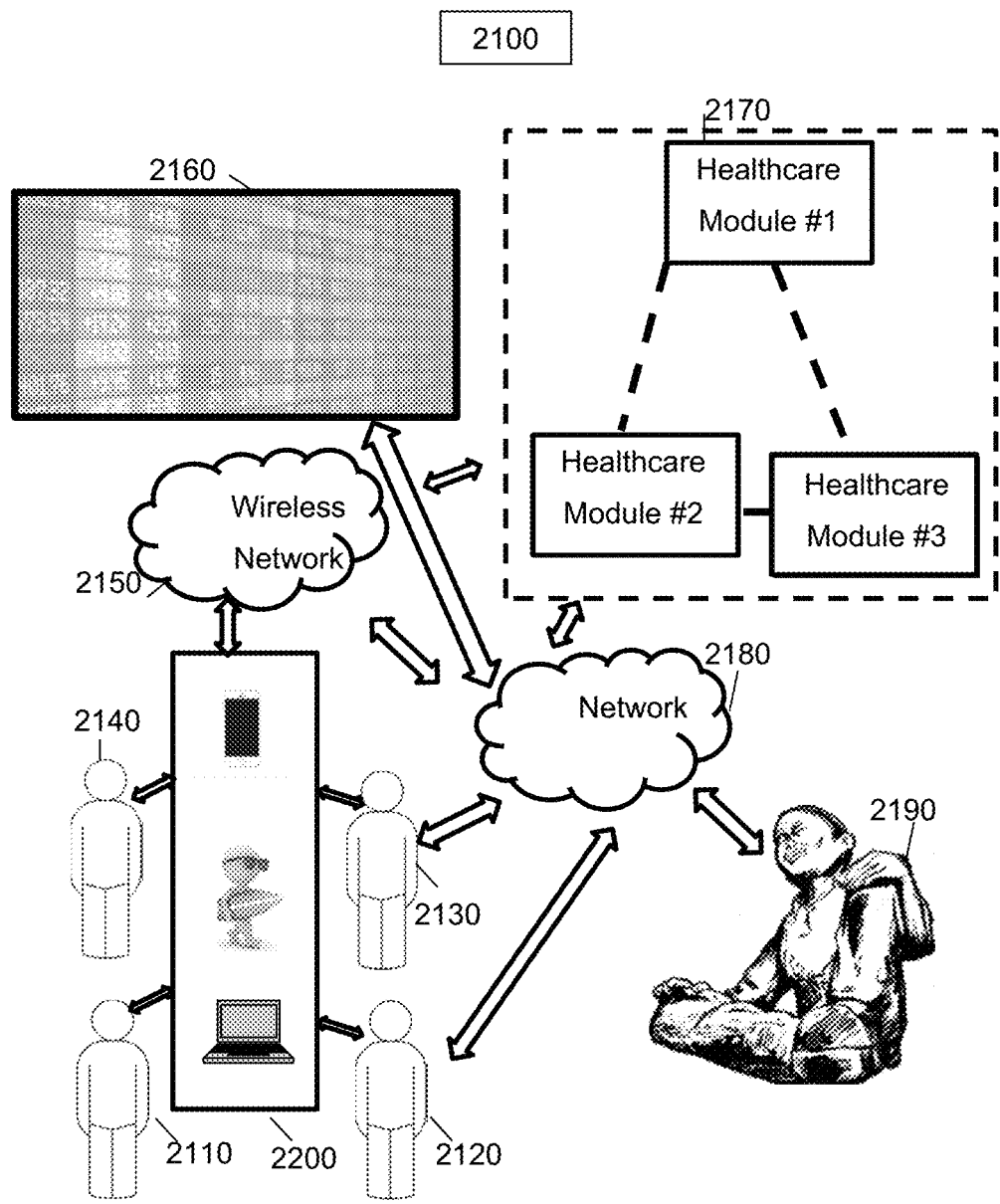
FIG. 21 illustrates a schematic diagram of implementations of methods considering the game application and marketplace, and standard level of service with respect to the business of healthcare.

FIG. 21 is a network schematic of many elements of the system 2100 and various embodiments of the methods to fully integrate the most efficient business transaction in the context of a healthcare and healthcare services module to make an outcome for the plurality of users 2110, 2140, 2130, 2120 on the network 2180 and their location data from the wireless network 2150 and client devices 2200. The plurality of users 2110, 2140, 2130, 2120 may use client devices 2200 to access the network 2180 and wireless network 2150 to make business transactions on the business transaction exchange 2160. The network 2180 may interact with the game network engine 270 to form a plurality of business transaction opportunities for users 2110. In one embodiment of the claimed methods the network 2180 may interact with the game engine database 250 and game engine network 270 as well as social network database 240 to allow users 2110 to post business transaction bids for healthcare or healthcare services in the healthcare module 2170. In another implementation, a user 2110 may post an offer for a single healthcare or healthcare services unit or multiple healthcare or healthcare services units to offer or buy healthcare or healthcare service units in the healthcare module 2170. Users 2110 may have game incentives to join up with other users 2130 to share healthcare or healthcare service needs within the healthcare module 2170. The various plurality of actions users 2110 make allow for various game worlds to unlock and higher game levels to be obtained and more points to be awarded. Users may then be able to unlock the relationship with a charity user 2190 that will enable the user 2110 to make contact with the charity user 2190 and also the business transaction consummated by user 2110 to use the healthcare module with user 2130 on the business transaction exchange 2160 in the system 2100 using the client devices 2200 may provide an economic benefit to charity user 2190 or the associated charity need database project record 230. The network 2180 may also provide a record from the charity user need database 230 to log a record in a scrapbook in the game engine database 250 for the user 2110 to see their global impact from simple daily business transactions. The strategy of the game further allows for the charity work to build across a diverse set of worlds that work on basic charity human needs such as a world for solving world hunger, a world for solving the energy crisis, a world for solving health issues, a world for solving the problem of being guilty when you are innocent, a world for solving the refugee crisis, a world for reducing global emissions, a world for solving food waste, a world for solving education, a world for solving the foster child and orphan crisis, a world for solving the homeless crisis, a world for helping the foreigner or immigrant crisis, a world for ending sex trafficking, a world for increasing agricultural productivity, a world for solving gender inequality, a world for helping animals, a world for helping the environment and a world for community development.

Figure 22:
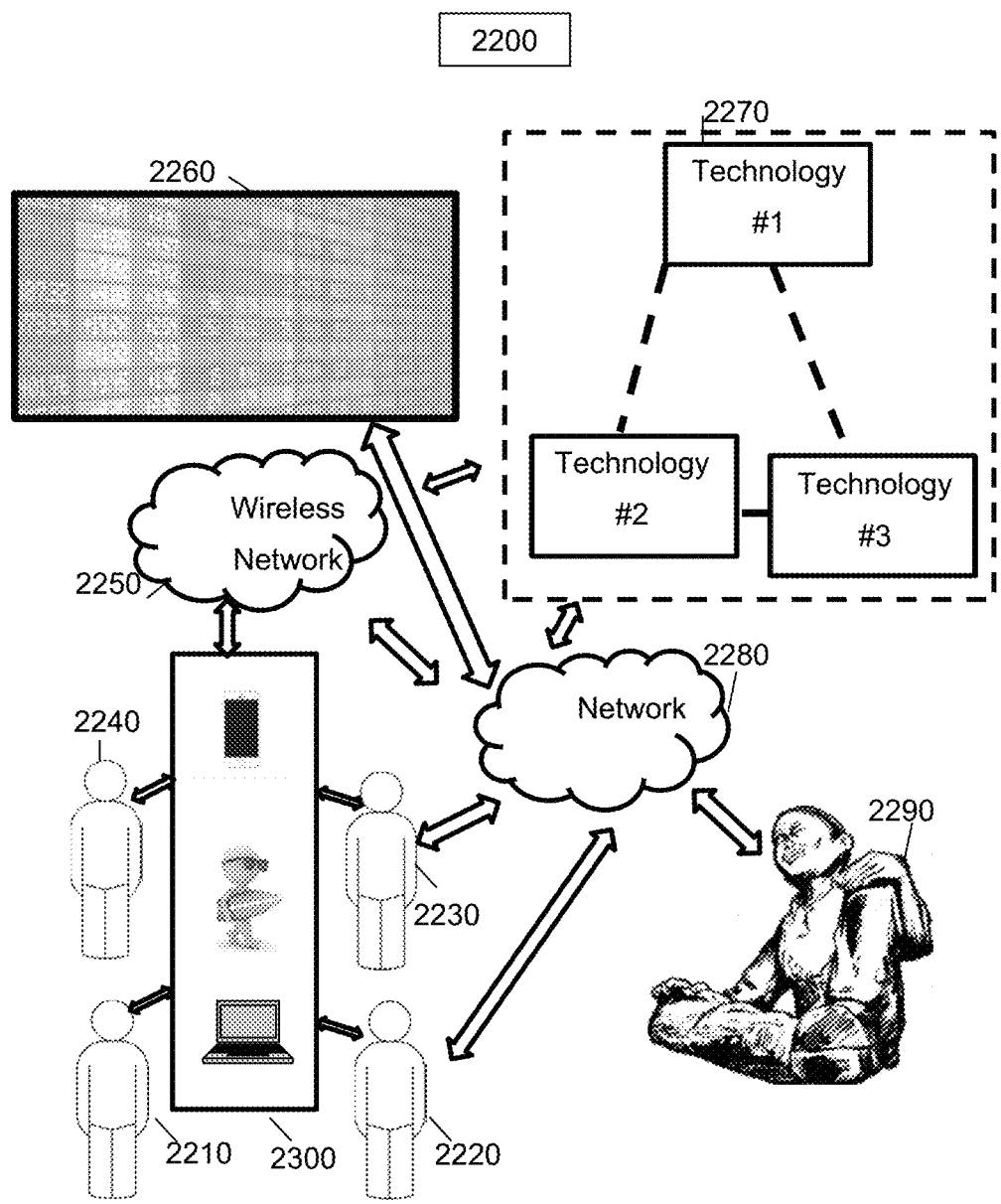
FIG. 22 illustrates a schematic diagram of implementations of methods considering the game application and marketplace, and standard level of service with respect to the business of technology.

FIG. 22 is a network schematic of many elements of the system 2200 and various embodiments of the methods to fully integrate the most efficient business transaction in the context of a technology or technology services module to make an outcome for the plurality of users 2210, 2240, 2230, 2220 on the network 2280 and their location data from the wireless network 2250 and client devices 2300. The plurality of users 2210, 2240, 2230, 2220 may use client devices 2300 to access the network 2280 and wireless network 2250 to make business transactions on the business transaction exchange 2260. The network 2280 may interact with the game network engine 270 to form a plurality of business transaction opportunities for users 2210. In one embodiment of the claimed methods the network 2280 may interact with the game engine database 250 and game engine network 270 as well as social network database 240 to allow users 2210 to post business transaction bids for technology or technology services in the technology module 2270. In another implementation, a user 2210 may post an offer for a single technology or technology services unit or multiple technology or technology service units to offer or buy technology or technology service units in the technology module 2270. Users 2210 may have game incentives to join up with other users 2230 to share technology or technology service needs within the technology module 2270. The various plurality of actions users 2210 make allow for various game worlds to unlock and higher game levels to be obtained and more points to be awarded. Users may then be able to unlock the relationship with a charity user 2290 that will enable the user 2210 to make contact with the charity user 2290 and also the business transaction consummated by user 2210 to use the technology module with user 2230 on the business transaction exchange 2260 in the system 2200 using the client devices 2300 may provide an economic benefit to charity user 2290 or the associated charity need database project record 230. The network 2280 may also provide a record from the charity user need database 230 to log a record in a scrapbook in the game engine database 250 for the user 2210 to see their global impact from simple daily business transactions. The strategy of the game further allows for the charity work to build across a diverse set of worlds that work on basic charity human needs such as a world for solving world hunger, a world for solving the energy crisis, a world for solving health issues, a world for solving the problem of being guilty when you are innocent, a world for solving the refugee crisis, a world for reducing global emissions, a world for solving food waste, a world for solving education, a world for solving the foster child and orphan crisis, a world for solving the homeless crisis, a world for helping the foreigner or immigrant crisis, a world for ending sex trafficking, a world for increasing agricultural productivity, a world for solving gender inequality, a world for helping animals, a world for helping the environment and a world for community development.

In one implementation or embodiment of various methods, the bid-offer computer exchange network 1160, 1260, 1360, 1460, 1560, 1660, 1760, 1860, 1960, 2060, 2160, 2260 may standardize service by a liquidated damages contract and a service level agreement between various points and counterparties. The market would determine the price based on various bids and offers the members submit. The data algorithms may also minimize cost and efficiency by utilizing wireless phone network GPS locations and other inputs. The benefit to this market driven solution changes the system into available units or capacity into smaller units so that larger non-unitized structures are made more efficient. More or less, the system 1100, 1200, 1300, 1400, 1500, 1600, 1700, 1800, 1900, 2000, 2100, 2200 breaks the current disjointed, inefficient system into component parts. Utilizing unused capacity and services will stand to lower waste and sub-optimal economic outcomes significantly by more efficiently using existing capacity within the existing systems. Further the reality game format will provide a mechanism for users to have fun, create a life memoir of helping people and to pass a portion of the savings to charities of choice. Certain levels of gaming will only be accessible if certain capacity requirements are met.

Implementations of additional methods and modules to allow anyone to join as a member of the community (businesses and individuals). Once a member of the network community, users 110 may agree to a standard service level agreement with penalties and liquidated damages under contract for variance in performance. The maximum liquidated damage of the agreement is the cost of the agreed good or service. Users 110 may utilize a plurality of data and sources of data in determining which modules they use. As in any commodity market, a forward curve of pricing may be developed with various time commitments to ensure variable liquidity along the forward curve to incent both financial and physical players to trade the markets.

In one implementation, the method and system for incenting a business transaction may be to battle a virtual in game character in a reality, augmented reality and mixed reality context which would then allow the user 110 access upon defeat of the in game character 530 to unlock a world where the network user 110 has freed a real person or charity user 120 who has been oppressed or disadvantaged in the network community. In another implementation of the method, the method in the relational network database may connect the real people unknown to each other.

The claimed subject matter is not limited to implementations that solve any or all of the noted disadvantages. Further, the summary section is provided to introduce a selection of concepts in a simplified form that are further described below in the detailed description section. The summary section is not intended to identify key features or essential features of the claimed subject matter, nor is it intended to be used to limit the scope of the claimed subject matter.

While the foregoing is directed to embodiments of the present invention, other and further embodiments of the invention may be devised without departing from the basic scope thereof, and the scope thereof is determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, comprising:

using one or more computing systems to provide a computerized business transaction exchange for a plurality of users, wherein the computerized business transaction exchange is configured to provide one or more prices for a healthcare service to be performed at a first location;

receiving an offer price from a first user of the plurality of users for the healthcare service to be performed at the first location;

receiving a bid price from a second user of the plurality of users for the healthcare service to be performed at the first location;

generating a display of the computerized business transaction exchange to the plurality of users, wherein the computerized business transaction exchange includes the offer price from the first user and the bid price from the second user; and communicating with a satellite navigation system to determine locations for the first location, the first user, the second user, or combinations thereof in order to complete a business transaction between the first user and the second user through the computerized business transaction exchange.

2. The method of claim 1, further comprising:

in response to the bid price, receiving an updated offer price from the first user for the healthcare service to be performed at the first location; and generating a display of the computerized business transaction exchange to the plurality of users, wherein the computerized business transaction exchange includes the updated offer price.

3. The method of claim 1, further comprising:

in response to the offer price, receiving an updated bid price from the second user for the healthcare service to be performed at the first location; and generating a display of the computerized business transaction exchange to the plurality of users, wherein the computerized business transaction exchange includes the updated bid price.

4. The method of claim 1, wherein a unit of the computerized business transaction exchange comprises the healthcare service to be performed at the first location.

5. The method of claim 1, further comprising receiving an agreement between the first user and the second user to perform the healthcare service at the first location.

6. The method of claim 5, further comprising:

providing one or more awards to the first user and to the second user based on the agreement; and providing one or more charitable options to the first user and to the second user based on the one or more awards.

7. The method of claim 5, wherein the one or more awards are provided using a game engine database.

8. The method of claim 1, further comprising unitizing the healthcare service.

9. The method of claim 1, wherein the computerized business transaction exchange is provided to the plurality of users via a computerized social network.

10. A method, comprising:

using one or more computing systems to provide a computerized business transaction exchange for a plurality of users, wherein the computerized business transaction exchange is configured to provide one or more prices for a commodity to be provided at a first location;

receiving an offer price from a first user of the plurality of users for the commodity to be provided at the first location;

receiving a bid price from a second user of the plurality of users for the commodity to be provided at the first location;

generating a display of the computerized business transaction exchange to the plurality of users, wherein the computerized business transaction exchange includes the offer price from the first user and the bid price from the second user; and communicating with a satellite navigation system to determine locations for the first location, the first user, the second user, or combinations thereof in order to complete a business transaction between the first user and the second user through the computerized business transaction exchange.

11. The method of claim 10, further comprising:

in response to the bid price, receiving an updated offer price from the first user for the commodity to be provided at the first location; and generating a display of the computerized business transaction exchange to the plurality of users, wherein the computerized business transaction exchange includes the updated offer price.

12. The method of claim 10, further comprising:

in response to the offer price, receiving an updated bid price from the second user for the commodity to be provided at the first location; and generating a display of the computerized business transaction exchange to the plurality of users, wherein the computerized business transaction exchange includes the updated bid price.

13. The method of claim 10, wherein a unit of the computerized business transaction exchange comprises the commodity to be provided at the first location.

14. The method of claim 10, further comprising receiving an agreement between the first user and the second user to provide the commodity at the first location.

15. The method of claim 14, further comprising:

providing one or more awards to the first user and to the second user based on the agreement; and providing one or more charitable options to the first user and to the second user based on the one or more awards.

16. The method of claim 10, further comprising unitizing the commodity.

17. The method of claim 10, wherein the computerized business transaction exchange is provided to the plurality of users via a computerized social network.

18. A computer system, comprising:

one or more processors; and one or more memory comprising program instructions executable by the one or more processors to:

provide a computerized business transaction exchange for a plurality of users, wherein the computerized business transaction exchange is configured to provide one or more prices for a healthcare service to be performed at a first location;

receive an offer price from a first user of the plurality of users for the healthcare service to be performed at the first location;

receive a bid price from a second user of the plurality of users for the healthcare service to be performed at the first location;

generate a display of the computerized business transaction exchange to the plurality of users, wherein the computerized business transaction exchange includes the offer price from the first user and the bid price from the second user; and communicate with a satellite navigation system to determine locations for the first location, the first user, the second user, or combinations thereof in order to complete a business transaction between the first user and the second user through the computerized business transaction exchange.

19. The computer system of claim 18, wherein the program instructions further comprise program instructions executable by the one or more processors to:

in response to the bid price, receive an updated offer price from the first user for the healthcare service to be performed at the first location; and generate a display of the computerized business transaction exchange to the plurality of users, wherein the computerized business transaction exchange includes the updated offer price.

20. The computer system of claim 18, wherein the program instructions further comprise program instructions executable by the one or more processors to:

in response to the offer price, receive an updated bid price from the second user for the healthcare service to be performed at the first location; and generate a display of the computerized business transaction exchange to the plurality of users, wherein the computerized business transaction exchange includes the updated bid price.

* * * * *